US010026299B2

(12) United States Patent
Warren

(10) Patent No.: US 10,026,299 B2
(45) Date of Patent: Jul. 17, 2018

(54) MOBILE SUPPORTED DISARMING

(71) Applicant: Vivint, Inc., Provo, UT (US)

(72) Inventor: Jeremy Bruce Warren, Draper, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/050,051

(22) Filed: Feb. 22, 2016

(65) Prior Publication Data

US 2017/0109998 A1 Apr. 20, 2017

Related U.S. Application Data

(63) Continuation-in-part of application No. 14/885,615, filed on Oct. 16, 2015.

(51) Int. Cl.

*G08B 25/00* (2006.01)
*G07C 9/00* (2006.01)
*H04N 5/232* (2006.01)
*H04L 29/06* (2006.01)

(52) U.S. Cl.

CPC ........ *G08B 25/008* (2013.01); *G07C 9/00119* (2013.01); *G07C 9/00309* (2013.01); *G07C 9/00571* (2013.01); *H04L 63/062* (2013.01); *H04N 5/23206* (2013.01); *G07C 2009/00412* (2013.01); *G07C 2009/00507* (2013.01); *G07C 2009/00769* (2013.01); *G07C 2009/00984* (2013.01)

(58) Field of Classification Search

CPC ............ G07C 9/00119; G07C 9/00309; G07C 9/00571; H04L 63/062; H04N 5/23206; G08B 25/008

USPC ................................................ 340/5.61–5.62

See application file for complete search history.

(56) References Cited

U.S. PATENT DOCUMENTS 6,286,102 B1 9/2001 Cromer et al.
6,377,173 B1 4/2002 Desai
6,484,260 B1 11/2002 Scott et al.
6,960,990 B2 11/2005 McKibbon
7,174,017 B2 2/2007 Bantz et al.

(Continued)

FOREIGN PATENT DOCUMENTS

EP 0700185 A2 3/1996

OTHER PUBLICATIONS

PCT International Search Report for International Application No. PCT/US2016/055141, dated Jan. 18, 2016 (3 pp.).

(Continued)

*Primary Examiner* — Qutbuddin Ghulamali
(74) *Attorney, Agent, or Firm* — Holland & Hart LLP

(57) ABSTRACT

In some embodiments, security and/or automation systems, hereinafter referred to as automation systems, may enable a user to deactivate a security portion of an automation system using a mobile device. An automation system may detect the presence of an authorized mobile device which may modify a status of at least one component of the automation system. The automation system may be installed at a user's residence and may identify when the user's mobile device enters a geographical region surrounding the residence. Modifying a status of at least one component may include deactivating a security component of the automation system. This may enable the user to enter the residence without the need to enter a code into a control panel.

20 Claims, 16 Drawing Sheets

(56) References Cited

U.S. PATENT DOCUMENTS

| | | | | |
|---|---|---|---|---|
| 7,988,038 | B2 | 8/2011 | Beenau et al. | |
| 8,102,999 | B2 | 1/2012 | Corndorf | |
| 8,730,029 | B2 | 5/2014 | Petricoin, Jr. | |
| 8,971,854 | B2 | 3/2015 | Addy et al. | |
| 9,141,150 | B1* | 9/2015 | Trundle | G06F 1/1694 |
| 2005/0135616 | A1 | 6/2005 | Dellow et al. | |
| 2007/0279184 | A1 | 12/2007 | Desai et al. | |
| 2008/0107274 | A1 | 5/2008 | Worthy | |
| 2008/0271123 | A1 | 10/2008 | Ollis et al. | |
| 2009/0022315 | A1 | 1/2009 | Leung | |
| 2013/0243265 | A1 | 9/2013 | Langen | |
| 2014/0118120 | A1 | 5/2014 | Chen et al. | |
| 2014/0215567 | A1 | 7/2014 | Yoshizawa et al. | |
| 2015/0048924 | A1 | 2/2015 | Feldstein et al. | |
| 2015/0116109 | A1* | 4/2015 | Fadell | G08B 19/005<br>340/501 |
| 2015/0161370 | A1 | 6/2015 | North et al. | |
| 2015/0279134 | A1 | 10/2015 | Warren | |
| 2015/0293509 | A1 | 10/2015 | Bankowski et al. | |

OTHER PUBLICATIONS

PCT International Search Report for PCT International Application No. PCT/US2017/016651, dated May 30, 2017 (3 pp.).

* cited by examiner

MOBILE SUPPORTED DISARMING

CROSS-REFERENCE TO RELATED APPLICATIONS

This application is a continuation-in-part of U.S. patent application Ser. No. 14/885,615, filed Oct. 16, 2015, titled "Secure Key Fob," the disclosure of which is hereby incorporated in its entirety by reference.

BACKGROUND

The present disclosure, for example, relates to security and/or automation systems, and more particularly to deactivating automation and/or security systems.

Security and automation systems are widely deployed to provide various types of communication and functional features such as monitoring, communication, notification, and/or others. These systems may be capable of supporting communication with a user through a communication connection or a system management action.

The following relates to security of portable electronic transmitters used in home automation and/or security system applications. Security and automation systems may use triggering mechanisms as a way to initiate or trigger system changes. In general, however, these triggering mechanisms broadcast out in the open without any signal protection from calculated, malicious attackers. These attackers potentially sift the triggering mechanism's signals—such as a "disarm" signal—replicate the signal, and then employ a counterfeit triggering mechanism. This counterfeit triggering mechanism allows the attacker to effectively bypass the security or the automation system protection by counterfeiting the signal and remaining undetected.

The present disclosure relates to providing a more secure means by which a user may deactivate his home security system using a mobile device. With the wide-spread use of computers and mobile devices has come an increased presence of automation and security products. Automation and security products may fully automate aspects of a residence and/or business. In some instances, a user may wish to deactivate an automation system automatically using a mobile device using voice control.

SUMMARY

In some embodiments, security and/or automation systems, hereinafter referred to as automation systems, may enable a user to deactivate a security portion of an automation system using a mobile device. An automation system may detect the presence of an authorized mobile device which may modify a status of at least one component of the automation system. The automation system may be installed at a user's residence and may identify when the user's mobile device enters a geographical region surrounding the residence. Modifying a status of at least one component may include deactivating a security component of the automation system. This may enable the user to enter the residence without the need to enter a code into a control panel.

In one embodiment, a method for security and/or automation systems is described. The method may include identifying a mobile device associated with a user entering a geographical region surrounding a residence. The method may include detecting that the mobile device has connected with a Wi-Fi network associated with the residence and authenticating the mobile device based at least in part on the detecting. The method may include automatically modifying a status of at least one component of an automation system associated with the residence based at least in part on the authenticating.

In one embodiment, automatically modifying the status of the at least component of the automation system may include any of disarming an alarm associated with the automation system, or unlocking at least one door in the residence, or deactivating an audio and/or video monitoring system, or a combination thereof.

In another embodiment, the residence may be in an activate alarm state prior to the identifying.

In another embodiment, modifying the status of the at least one component of the automation system may further include recognizing a secondary authentication prior to modifying the status of the least one component of the automation system, wherein the secondary authentication includes any of a biometric validation, or a secondary access code, or a combination thereof.

In another embodiment, the method may include establishing a geo-fence associated with the geographical region surrounding the residence.

In another embodiment, the method may include tracking a location of the mobile device in relation to the established geo-fence.

In another embodiment, the method may further include performing a secondary action based at least in part on a plurality of predetermined preferences inputted by the user associated with the mobile device.

In some embodiments, the secondary action may include any of turning on or off a plurality of lights, or adjusting a thermostat, or activating or deactivating a component of the security and/or automation system, or a combination thereof.

In some embodiments, the method may include recognizing an entry into the residence by the user.

In some embodiments, recognizing the entry further includes identifying a user-specific code used to enter the residence.

In other embodiments, an apparatus for security and/or automation systems is described. The apparatus may include a processor, memory in electronic communication with the processor and instructions stored in the memory. The instructions may be executable by the processor to identify a mobile device associated with a user entering a geographical region surrounding a residence, detect that the mobile device has connected with a Wi-Fi network associated with the residence, authenticate the mobile device based at least in part on the detecting, and automatically modify a status of at least one component of an automation system associated with the residence based at least in part on the authenticating.

In another embodiment, a non-transitory computer-readable medium storing computer-executable code is described. The code may be executable by a processor to identify a mobile device associated with a user entering a geographical region surrounding a residence, detect that the mobile device has connected with a Wi-Fi network associated with the residence, authenticate the mobile device based at least in part on the detecting, and automatically modify a status of at least one component of an automation system associated with the residence based at least in part on the authenticating.

The foregoing has outlined rather broadly the features and technical advantages of examples according to this disclosure so that the following detailed description may be better understood. Additional features and advantages will be described below. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein—including their organization and method of operation—together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following a first reference label with a dash and a second label that may distinguish among the similar components. However, features discussed for various components—including those having a dash and a second reference label—apply to other similar components. If only the first reference label is used in the specification, the description is applicable to any one of the similar components having the same first reference label irrespective of the second reference label.

Figure 1:
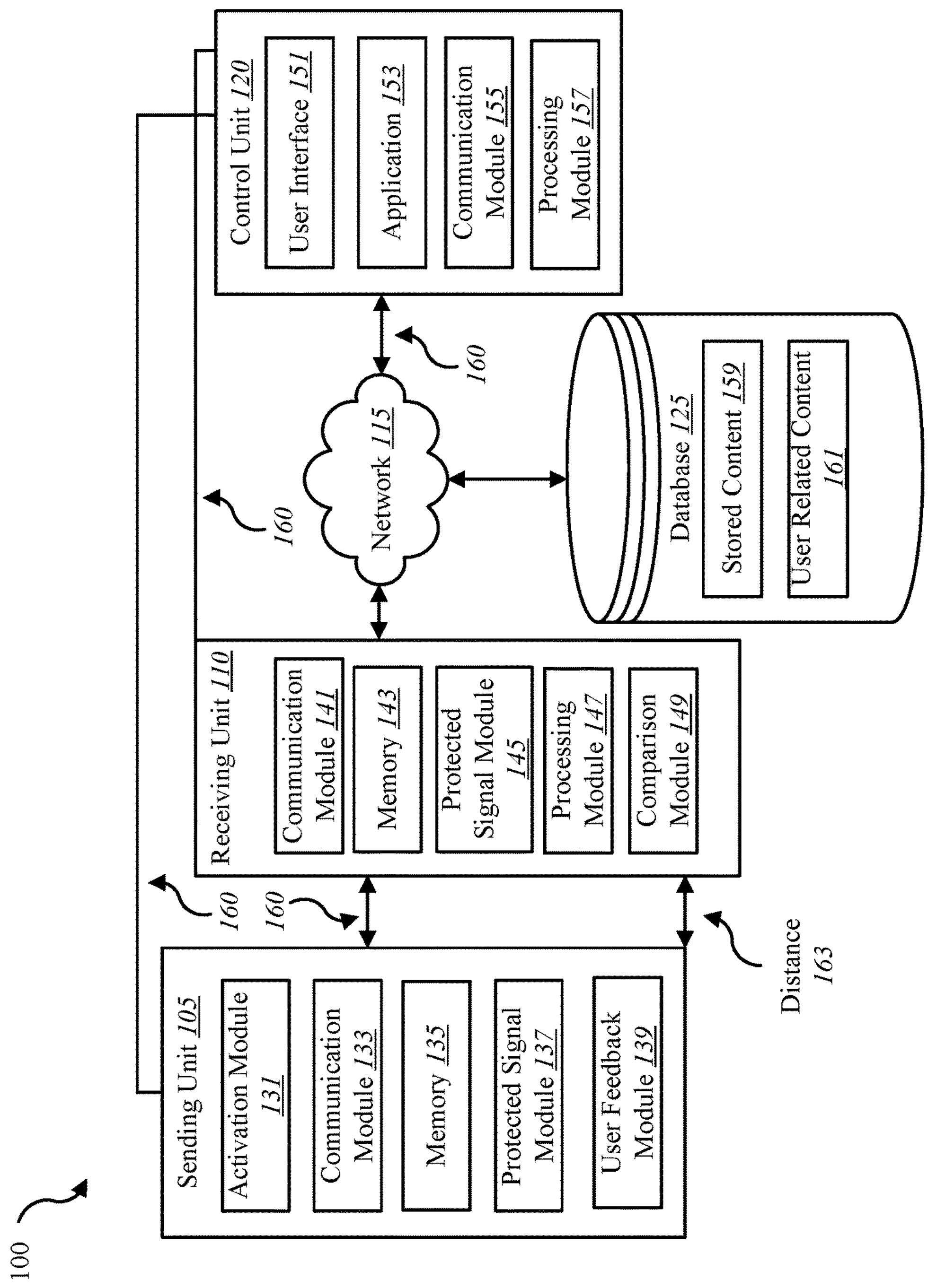
FIG. 1 depicts a block diagram of exemplary systems and methods suitable for implementing the present systems and methods.

While the embodiments described here are susceptible to various modifications and alternative forms, specific embodiments have been shown merely by example in the drawings and are described in detail. The exemplary embodiments described, however, are not limited to the particular forms, details, structures, or other characteristics disclosed. Rather, this disclosure covers all modifications, equivalents, and alternatives falling within the scope of the appended claims.

DETAILED DESCRIPTION

Some embodiments relate to systems, methods, and related devices for enhancing security and home automation system components and communications. Security and home automation systems may use system triggering mechanisms without adequate protection of the communication between the triggering mechanism and the system and/or other associated devices. In some instances, malicious individuals may counterfeit the signals and/or operations of the triggering mechanism and/or the system. Current systems may employ out-in-the-open triggering mechanisms and communications—unprotected from these malicious attackers. These attackers may replicate the signals, create a counterfeit, and bypass the security systems unnoticed. This may result in security breaches by the malicious actors.

In some embodiments the portable transmitter, such as a key fob, may include a specifically-designed encryption procedure. This encryption procedure may incorporate using an electronic "key." In some embodiments, the encryption information (and potentially associated decryption information) is transmitted to a receiving unit, which may include and/or be in communication with a home security system panel. In some embodiments, one or more devices such as the receiving unit decrypt the encrypted signal and then compare the information in the now-decrypted signal with information accessible by one or more devices associated with the system including the panel and/or the network.

In some embodiments the portable transmitter may include authentication procedures and protocols—including the use of "secret" information. In some embodiments, the authentication information including the secret information is transmitted to a receiving unit. When the authentication is received at the received unit, the system may need to perform additional processes to access the authentication information.

In some embodiments authentication information—sometimes stored as a "hash"—may also be encrypted. Thus, to access the authentication information the protected signal may need to be decrypted first. After this decryption, the system may need to then authenticate the signal received, including the secret information. In essence, this provides a two-tiered protection system that will be even more secure from the malicious attacks attempting to counterfeit these signals. In some embodiments decryption, authentication, and/or other related steps may be performed simultaneously, in parallel, and/or in series.

Third, in some embodiments the key fob may include changing some portion of the encryption, authentication, and/or other information after a certain number of "events," such as arming or disarming the system. In some embodiments the changing may occur randomly or pseudo-randomly. In some embodiments this changing may be rotating certain characteristics, such as the electronic "key" or the "secret" information. In other embodiments this changing may be creating entirely new characteristics, such as a new electronic "key" or new "secret." In some embodiments this changing may be based on a certain number of events. In some embodiments this changing may be performed pseudo-randomly such that one or both of a sending unit and a receiving unit will anticipate the correct information to be sent and received allowing for the units to be synced and secure.

In some embodiments involving changing or rotating information, a specific number of triggering "events" are used. In some instances, using 12 triggering events becomes advantageous, particularly when using certain encryption or authentication characteristics—such as the number of bits of the information. In some instances, the key may be 128-bit, so for each of the 12 events the system may use ¼ of the 128-bits, effectively meaning that for every 12 events only 3 full sets of the 128-bits would be used.

In other embodiments, the portable transmitter and other devices may have additional protection requirements. As one example, the key fob and/or the security system panel may have restrictions regarding encryption, authentication, changing characteristics, and/or other characteristics. For instance, the security system via the panel may require that the portable transmitter be positioned within a certain distance (e.g., 100, 50, 10, 5, 3, or 2 meters) in order for one or more of decryption, authentication, changing, and/or other characteristics to function. This may provide an additional level of physical protection against someone attempting to acquire security related information and create a counterfeit key fob—but who cannot gain entry to the structure without forcible entry.

The embodiments may be used separately or in a variety of combinations. For example, some portable transmitters—like key fobs—may include capabilities related to both encryption and authentication. Others may include capabilities related to encryption and pseudo-randomly changing certain information based on a number of events. Or, in other embodiments, the portable transmitters may include capabilities related to using multiple solutions at different times or at the same time—based at least in part on one or more various parameters. In some embodiments using certain combinations of these solutions may be based on one or more triggered events—such as a perceived attempted breach of the security system. For example, based on an attempted breach, a portable transmitter that only initially utilized encryption may then also employ authentication and/or may change certain information. The system may be configured this way to provide additional security protocols based at least in part on any triggering event.

In some embodiments a sending unit may include a portable transmitter. In some embodiments a portable transmitter may include a key fob. In some embodiments a sending unit may include but not is not limited to a key fob, a mobile phone, a wearable electronic device (e.g., a fit bit), a PDA, a tablet, a portable computing device, etc.

In some embodiments, the sending unit may track the location of the portable transmitter. The sending unit may comprise a control panel or other component of the automation system and may establish a geographical region surrounding a residence where the automation system is in use. The geographical region may comprise a geo-fence. The sending unit may track the location of the portable transmitter and may detect when the portable transmitter enters the geo-fence. The sending unit may then initiate one or more alterations to at least one component of the automation system. The alterations may include altering a status of at least one security component of the security system. The alteration may additionally and/or alternatively include initiating alteration of a lighting status, HVAC setting, or the like.

In some embodiments the system may perform one or more operations automatically based on receiving one or more inputs including, but not limited to, inputs related to a protected a signal, encryption, authentication, a key, a secret, a key serial number, and/or others. In some embodiments, the system may permit a user to manually trigger one or more actions, including those related to a protected signal such as transmitting, receiving, decrypting, authenticating, changing, modifying, comparing, and/or other actions disclosed in this disclosure.

In some embodiments, the secure key fob may employ different modes. These different modes may include one or more secure modes and/or one or more legacy modes. The one or more secure modes may include a highly protected mode requiring additional protocols and steps—relating to the protected signal itself and also not relating to the protected signal. In some embodiments the one or more legacy modes may be used with certain specific hardware. In some embodiments, the key fob may provide specific audio, visual, and/or tactile information to notify the user of the mode and whether such a mode has been started and/or altered.

Any discussion of any apparatus, system, method, and/or any other characteristic discussed with respect to one element is not limiting and applies to every other discussion of that same element same element type (e.g., another system), and/or any other element type (e.g., another device and/or method).

FIG. 1 is a block diagram illustrating one embodiment of a system 100 in which the present systems and methods may be implemented. In some embodiments, the systems and methods described herein may be performed in relation to on one or more devices illustrated in system 100. The system 100 may include sending unit 105, receiving unit 110, control unit 120, database 125, and/or network 115 that allows sending unit 105, receiving unit 110, control unit 120, and/or database 125 to communicate with one another—directly between any of the components, indirectly through one or more intermediate components, and/or some combination of both.

Although elements of sending unit 105, receiving unit 110, control unit 120, and/or database 125 may be depicted as being internal to the respective components, it is understood that one or more of the elements may be external to each component and may be connected to one or more respective components (e.g., 105, 110, 115, 120, and/or 125) through one or more wired and/or wireless connections.

Sending unit 105 may include an activation module 131, communication module 133, memory 135, protected signal module 137, and/or user feedback module 139. Sending unit 105 may connect to receiving unit 110 using a connection 160. Connection 160 may include a wired connection, a wireless connection, and/or both. In some embodiments, the connection 160 may facilitate communication, transmission, encryption, authentication, and/or changing certain signal characteristics, among other things.

In some embodiments, the sending unit 105 may include an activation module 131. The activation module 131 may include any button, switch, knob, toggle, lever, regulator, actuator, and/or other device for activating. In some embodiments, the activation module 131 may activate sending unit 105, receiving unit 110, network 115, control unit 120, and/or database 125. In some embodiments, the activation module 131 may be actuated by a user electronically, manually, and/or physically, including being actuated by the user's hand. In some embodiments, the activation module 131 may be actuated based at least in part on one or more inputs, such as a system 100 input, that may send a signal from the activation module 131 to another module of the sending unit 105.

In some embodiments, the sending unit 105 may include a communication module 133. The communication module 133 may facilitate communication between the sending unit 105 and other components of system 100, including but not limited to receiving unit 110, network 115, control unit 120, and/or database 125. In some embodiments, the communication module 133 may facilitate communication between the sending unit 105 and elements of other system elements, such as communication module 141, communication module 155, and/or stored content 159, among others. In some embodiments, the communication module 133 may facilitate communication via one or more connections 160. In some embodiments, the communication module 133 may facilitate communication via one or more wired and/or wireless connections.

In some embodiments, the communication module 133 may generate a notification and/or a transmission in response to receiving a signal from one or more other modules, including but not limited to activation module 131, memory 135, protected signal module 137, user feedback module 139, and/or other components or elements of system 100. The notification and/or transmission may be sent to one or more components and/or elements of system 100.

In some embodiments, the sending unit 105 may communicate through communication module 133 (or not, but instead directly) with receiving unit 110, control unit 120, database 125, and/or other components and/or elements via a communication path that includes a combination and/or one or more designated connections 160 and/or network 115.

In some embodiments, network 115 may include cloud networks, local area networks (LAN), wide area networks (WAN), virtual private networks (VPN), wireless networks (using 802.11, for example), cellular networks (using 3G and/or LTE, for example), and/or other networks. In some embodiments the network 115 may include the internet. The network 115 may provide user authentication, encryption, access authorization, tracking, Internet Protocol (IP) connectivity, and other access, calculation, modification, and/or functions.

In some embodiments, the sending unit 105 may include memory 135. In some embodiments, the memory 135 may include computer executable instructions that can be executed by one or more processors. These one or more processors may be present in an element of the sending unit 105 (e.g., communication module and/or protected signal module 137) and/or one or more other components of system 100 (e.g., receiving unit 110 or control unit 120).

In some embodiments, the memory 135 may include computer executable instructions that may cause the sending unit 105 to interact with one or more components of system 100, such as the receiving unit 110. In some embodiments, the memory 135 may contain, among other code, the Basic Input-Output system (BIOS) which controls basic hardware operation such as the interaction with peripheral components or devices.

In some embodiments, the sending unit 105 may include protected signal module 137. In some embodiments, the protected signal module 137 may include one or more processors to perform one or more functions. In some embodiments, the protected signal module 137 may generate one or more signals, or alternatively, the protected signal module 137 may transmit one or more signals originated from other sources—including but not limited to other components of system 100.

In some embodiments, the protected signal module 137 may generate a signal having one or more characteristics. These characteristics may include creating one or more packets present in a signal. These one or more packets may include encryption information such as a key, authorization information such as a secret, and/or other information.

In some embodiments, a protected signal module 137 may communicate with other components of system 100 directly, through communication module 133, by connection 160, and/or by other communication methods.

In some embodiments, the protected signal module 137 may transmit one or more packets of information that have been encrypted. In some embodiments, the communication module 133 may transmit one or more packets of information that have been encrypted by one or more modules of sending unit 105. These encrypted packets may have been encrypted by sending unit 105, receiving unit 110, and/or some other component—present in system 100 or not. In some embodiments, these encrypted packets may include a status byte and/or one or more hash bytes. In some embodiments, the one or more hash bytes may each include a 24 bit hash.

In some embodiments, the one or more packets may include a counter, which may correspond to a number of events. The number of events may include the number of times one or more packets have been sent, the activation module 131 has been activated, and/or other events.

In some embodiments, user feedback module 139 may facilitate providing user feedback about one or more system 100 components. For example, the user feedback module 139 may provide feedback related to sending unit 105, receiving unit 110, network 115, control unit 120, and/or database 125. In some embodiments, user feedback module 139 may provide feedback related to connection 160. In some embodiments, this feedback may include visual, audible, tactile, and/or other types of feedback, or some combination of two or more feedback types. In some embodiments, this feedback may be related to one or more actuators (e.g., buttons) and/or light emitting diodes (LEDs).

In some embodiments, the receiving unit 110 may forward a protected signal, which may include encrypted packets, to a control unit 120. In some embodiments, control unit 120 may be a security system and/or home automation panel. In other embodiments, the receiving unit 110 may include, may be part of, or may be related to, a security system and/or home automation panel.

In some embodiments, protected signal module 145 may transmit one or more packets of information that have been encrypted. In some embodiments, communication module 141 may transmit one or more packets of information that have been encrypted by one or more modules of receiving unit 110. These encrypted packets may have been encrypted by one or more elements of sending unit 105, receiving unit 110, and/or some other component—present in system 100 or not. In some embodiments, these encrypted packets may include status information (e.g., a status byte) and/or hash information (e.g., one or more hash bytes). In some embodiments, the one or more hash bytes may each include a 24 bit hash.

In some embodiments, control unit 120 may transmit one or more packets of information to receiving unit 110, sending unit 105, and/or other components of system 100. In some embodiments, the control unit 120 may transmit one or more packets of information, where at least some of the one or more packets of information include information previously transmitted to the control unit 120 from at least one of receiving unit 110, sending unit 105, and/or other components of system 100.

In some embodiments, the sending unit 105 may include one or more information packets, where at least one of the one or more information packets may be encrypted, and where at least one of the one or more information packets may include a hash.

In some embodiments, the sending unit has an encryption algorithm designed to obscure data and/or a hash algorithm to require authentication of data. In some embodiments, the encryption may include a rabbit encryption, symmetric cryptograph, asymmetric cryptograph, and/or other type. In some embodiments, the authentication hash is a 24 bit hash.

In some embodiments, when activation module 131 is activated, (e.g., a button is pressed) data packets—encrypted and/or requiring authentication—are transmitted by the sending unit 105. In some embodiments, the receiving unit 110 receives the data packets transmitted by the sending unit 105 and then decrypts the encrypted data in the data packets, if applicable. In some embodiments, the encryption may include a key (e.g., a 128 bit key). In some embodiments, the processing module 147 may perform one or more operations disclosed with respect to the receiving unit 110. In some embodiments, a protected signal comprises one or more data packets.

In some embodiments, the key and/or the secret may be stored in the code section of sending unit 105, receiving unit 110, and/or others.

In some embodiments, the receiving unit 110 receives the data packets transmitted by the sending unit 105 and then hashes/authenticates the data. In some embodiments, the hash may include a secret (e.g., a 72 bit secret). Based at least in part on the hashing/authenticating of the data, the receiving unit 110 may transmit one or more data packets to control unit 120. Based at least in part on the hashing/authenticating of the data, the receiving unit 110 may transmit one or more data packets to a security and/or home automation system panel.

In some embodiments, the sending unit 105 may generate a key used for encryption and/or a secret used for authentication. The key and/or the secret may be generated based on user input, based on system-detected parameters, based on system events, and/or automatically.

In some embodiments, the key and/or the secret may be generated based on input received by the activation module 131. The input received by the activation module 131 may include a number of times an actuator (e.g., a button) is actuated. Alternatively, the input received by the activation module 131 may include whether a combination of one or more actuators is actuated. In some embodiments, the input received by the activation module 131 may include whether one or more actuators are actuated for a time interval (e.g., 5, 10, 15, 20, or 30 seconds).

In some embodiments, the input required to generate a key and/or a secret may be sufficient to prevent errant, meaningless generations. For example, the time interval required may be sufficiently long to avoid a user's errant input (e.g., 15 seconds or more). As another example, the input required may include one or more types of input—including but not limited to an input that a combination of one or more actuators are actuated over a certain time interval (e.g., buttons 1 and 3 are activated simultaneously for 15 seconds or more).

In some embodiments, the key and/or the secret may each be random, pseudo-random, non-random, non-pseudo random, and/or some combination. In some embodiments, the key is generated using a very low oscillator (VLO) and a random jump number that may be incremented by a predetermined value at a specified event (e.g., activating activation module 131). In some embodiments, the secret is generated using a VLO and a random jump number that may be incremented by a predetermined value at a specified event (e.g., activating activation module 131).

In some embodiments, the sending unit 105 may transmit a key and/or a secret. In some embodiments, transmitting a key and/or a secret from the sending unit 105 to another component of system 100 may occur after a certain time interval. For example, sending unit 105 may generate a key and/or a secret during a 15 second interval and then sending unit 105 may transmit the key and/or the secret after the 15 completion of the 15 second interval.

In some embodiments, the sending unit may transmit the key and/or the secret during the same time interval when each is generated. For example, sending unit 105 may generate a key and/or a secret during a 15 second interval and transmit the key and/or the secret during the same 15 second interval.

In some embodiments, the receiving unit 110 may receive the key and/or the secret. Based at least in part on receiving the key and/or the secret, the receiving unit 110 may store, transmit, map, and/or capture identifying information related to the sending unit 105 that transmitted the key and/or the secret. In some embodiments, this identifying information may include the key serial number of the sending unit.

In some embodiments, the receiving unit 110 may transmit the key and/or the secret to the control unit 120. In other embodiments, the receiving unit 110, based at least in part on receiving the key and/or the secret, may store, transmit, map, and/or capture identifying information to the control unit 120, where the information may be related to the sending unit 105 that transmitted the key and/or the secret. In other embodiments, the receiving unit 110, based at least in part on receiving the key and/or the secret, may store, transmit, map, and/or capture identifying information to the control unit 120, where the information may be related to the key and/or the secret.

In some embodiments, the sending unit 105 may communicate and/or be compatible with control unit 120 that may include a panel. In some embodiments, the sending unit 105 may be backwards compatible with control unit 120 that may include a panel. In some embodiments, the one or more data packets requiring decryption and hashing are transmitted by sending unit 105 to receiving unit 110 that may perform the decryption and/or the hashing; then at least some of the now-decrypted and/or the now-authenticated data packets may be transmitted to the control unit 120.

In some embodiments, the communication of information, including one or more data packets between the receiving unit 110 and control unit 120 may also include certain protections. In some embodiments, this communication protection may include encryption having a key and/or authentication having a secret.

In some embodiments, the receiving unit 110 may perform certain actions related to data packets, including but not limited to those data packets transmitted by the sending unit 105. In some embodiments, performing certain actions may be based at least in part on whether: the key and/or the secret have been transmitted to the receiving unit 110; the identifying information has been transmitted or received by the sending unit 105, receiving unit 110, and/or control unit 120; and/or other related parameters. In some embodiments, these certain actions may include decrypting one or more encrypted data packets, authenticating one or more data packets requiring authentication, and/or other related actions.

In some embodiments, the key and the secret may be transmitted by and/or to one or more devices. In some embodiments, the key and the secret may be transmitted simultaneously, in parallel, in series, and/or otherwise. For example, the sending unit 105 may transmit the secret to the receiving unit 110 and then transmit the key to the receiving unit 110. In other embodiments, the sending unit 105 may transmit the key to the receiving unit 110 and then transmit the secret to the receiving unit 110 and/or the control unit 120.

In some embodiments, any transmitting and/or communication may be performed via network 115. In some embodiments, network 115 may include a wired network, while in other embodiments, network 115 may include a wireless network. In some embodiments of system 100 (and others), network 115 may include wired/and or wireless connections. In some embodiments, components such as receiving unit 110 and control unit 120 may be connected in multiple ways, including having one or more wired and/or one or more wireless connections.

In some embodiments, the sending unit 105 may have one or more pieces of identifying information associated with the sending unit 105. This identifying information may include but is not limited to a key serial number, a unit number, a model name, a model number, a software or a hardware version, and/or other related information.

In some embodiments, activating the activation module 131 may change, modify, advance, and/or alter one or more of the identifying information. For example, in some embodiments, when a user activates one or more buttons, a key serial number associated with the sending unit 105 will advance in the sending unit 105 to a second key serial number. This second key serial number associated with the sending unit 105 may be transmitted to the receiving unit 110 based on a distance 163 and may be stored in memory 143, database 125, and/or other locations. If the sending unit 105 is within a certain distance 163 of receiving unit 110, then the second key serial number may be transmitted to the receiving unit 110. In some embodiments, activating the activation module 131 may change, modify, and/or advance one or more of the key and the secret.

In some embodiments, the distance 163 may be defined by a geographical region surrounding a residence where the system 100 is installed. The geographical region may be a predetermined distance surrounding the residence. In other embodiments, the distance 163 may be defined by a geo-fence surrounding the residence. The geo-fence may surround the property associated with the residence or may extend beyond property boundaries.

In some embodiments, at least one of the sending unit 105 and the receiving unit 110 may iterate one or more pieces of information, including but not limited to the key serial number, the key, the secret, and/or other information. For example, sending unit 105 may receive an input (e.g., activating activation module 131 such as a user pushing a button on sending unit 105). Based at least in part on this input, the information—such as the key serial number—may be incremented. In some embodiments, the key serial number (and/or other information such as the key) may be incremented based on every input iteration. For example, for every input received, a "rabbit" (e.g., a cipher) may be generated, one or more counters may be advanced, and/or the key serial number may be modified, changed, and/or advanced.

In some embodiments, after a predetermined number of iterations different operations may be performed. For example after four iterations a rabbit may be iterated and one or more counters may be advanced and/or after twelve iterations the key serial number may be modified, changed, and/or advanced and/or a new key (associated with encryption) may be generated and inserted to at least one of the sending unit 105, receiving unit 110, and/or control unit 120. In some embodiments, four iterations may be advantageous based on using a 128 bit key, where the four events use a sufficient number of bits to be secure but only use one-fourth of a 128 bit key. In some embodiments, twelve iterations may be advantageous based on using a 128 bit key, where the twelve iterations use a sufficient number of bits to be secure but only use in effect three full "events" related to the 128 bit key where each group of four iterations only requires one full 128 bit key.

In some embodiments, the encryption may include a key insertion, iteration, and/or generation. In some embodiments, the key insertion is executed after a predetermined number of inputs (e.g., activating activation module 131) such as X events. In some embodiments, the iteration is executed after a predetermined number of inputs, which may be more, less, or related by a specific relationship to X (e.g., X/3). In some embodiments, sending unit 105 and receiving unit 110 begin with the same base key.

After X events a new key may be inserted into at least one signal of sending unit 105 an/or receiving unit 110. The new key may be derived based at least in part on the base key and/or the key serial number, where the key serial number may include a counter. In some embodiments, the key serial number may be set at an initial value. Based on one or more inputs, the key serial number may be changed, decreased, incremented, and/or advanced. For example, when activation module 131 is activated the key serial number may advance by increments of 1, 2, 3, etc. In some embodiments, the key serial number may be used by the receiving unit 110 to determine if it is synced with the sending unit 105. In some embodiments, based at least in part on this determining at least one component of system 100 (e.g., receiving unit 110) may advance its encryption to correspond to the key serial number of the sending unit 105 (e.g., a portable transmitter).

In some embodiments, however, if distance 163 is more than a predetermined value then the key serial number will advance in the sending unit 105 (e.g., from a first key serial number to a second key serial number) but not in the receiving unit 110. This distance 163 may be calculated using GPS, one or more proximity sensors in sending unit 105 and/or receiving unit 110, one or more other sensors in communication with at least one component of system 100, based on learned user behavior, and/or by other methods. The distance 163 may additionally be established by a geographical region surrounding a residence or a geo-fence surrounding a residence where the system 100 is in use.

In some embodiments, whether the identifying information is transmitted and/or received by one or more devices may be based at least in part on distance and/or signal strength. For example, whether the sending unit 105 transmits the key and/or the secret to receiving unit 110 may be based at least in part on a threshold signal strength level, including but not limited to a received signal strength indication (RSSI), a received channel power indicator (RCPI), and/or another signal strength measure.

In some embodiments, when the signal strength level, such as an RSSI level, falls below a predetermined threshold, sending unit 105 will not transmit the data packets, the key, the secret, and/or other information. In some embodiments, when the signal strength level, such as an RSSI level, falls below a predetermined threshold, receiving unit 110 will not transmit and/or receive the data packets, the key, the secret, and/or other information. In some embodiments, this predetermined level may be based at least in part on a numerical value (e.g., 10%, 30%, 50%, 70%, etc.) and/or may be based at least in part on set level (e.g., 0×10, 0×30, 0×50, 0×70, 0×90). For example, in some embodiments, if the RSSI level associated with the sending unit 105 falls below a threshold level—such as 0×30—the one or more packets may be discarded by the receiving unit 110.

In some embodiments, if the key serial number associated with the sending unit 105 advances at the sending unit 105 but the receiving unit 110 does not, then the sending unit 105 may continue to advance the key serial number and/or continue to transmit the now-advanced key serial number. In some embodiments, after the sending unit 105 has advanced the key serial number, the sending unit 105 may transmit an updated key serial number to the receiving unit 110 when the two are within a distance 163. In some embodiments, this distance 163 may be a predetermined value, including but not limited to a system limitation, a programmed designated value, and/or other factors.

In some embodiments, the comparison module 149 may compare one or more pieces of information, including but not limited to information transmitted from the sending unit 105. In some embodiments, the comparison module 149 may compare one or more portions of a key serial number, a key, a secret, an encrypted data packet, a counter, a distance, an iteration value, and/or any other information. In some embodiments, the comparison module 149 may compare information related to or stored in receiving unit 110 with information related to or stored in sending unit 105. In some embodiments, the comparison module 149 may compare information related to or stored in the receiving unit 110 with information related to or stored in control unit 120. In some embodiments, the comparison module 149 may compare information related to or stored in receiving unit 110 with information related to or stored in database 125.

Alternatively, in some embodiments, if the key serial number has been advanced a certain number (N) times, then the sending unit 105 and the receiving unit 110 may require additional information and/or steps in order to communicate with each other. In some embodiments, N may be approximately 10, 20, 50, 75, 100, 200, 500, 1000, etc. In some embodiments, the sending unit 105 and the receiving unit 110 may then require resetting the key and/or the secret based on one or more parameters. In some embodiments, the sending unit 105 and the receiving unit 110 may then require resetting a random key and/or a random secret based on one or more parameters.

In some embodiments, the key serial number that may be associated with one or more sending units 105 may influence the encryption key used. In some embodiments, the key may include at least part of the key serial number, which may be used by the sending unit 105, the receiving unit 110, and/or other components. In some embodiments, the key may include at least part of the key serial number and the receiving unit 110 may use at least part of the key serial number to identify and/or associate the key as transmitted by or related to one or more sending units 105.

In some embodiments, control unit 120 may include a user interface 151, application 153, communication module 155, and/or processing module 157. At least some of these elements may exhibit similar and/or different characteristics to other elements disclosed with respect to other components (i.e., communication module 155 may be similar to and/or different from communication modules 133 and/or 141).

In some embodiments, the control unit 120 may display a notification on a display, which may include a user interface 151. This notification may relate at least in part to the protected signal module 137 related information, including but not limited to the protected signal including one or more data packets, the key, the secret, and/or the key serial number, among other things. Movement detection data and/or other information related to elements of the movement detection module may include, but is not limited to, activation module 131, communication module 133, memory 135, protected signal module 137, and/or user feedback module 139.

In some embodiments, an application 153 may be installed on control unit 120 in order to allow a user to interface with one or more functions of the sending unit 105 and/or the receiving unit 110, network 115, control unit 120, and/or database 125.

In some embodiments, one or more devices illustrated in system 100 may communicate and/or link to database 125. The database 125 may include stored content 159 and/or user related content 161. In some embodiments, the stored content 159 may include data generated, transmitted, or compared by at least one of the sending unit 105, the receiving unit 110, the control unit 120, and/or network 115. In some embodiments, information related to data packets, which may be encrypted and/or require authentication, may be included as stored content 159. In some embodiments, receiving unit 110 and/or control unit 120 may access stored content 159 in database 125 over network 115. In some embodiments, database 125 may be internal or external to one or more components of system 100 (i.e., connected to a device through network 115 and/or connected directly to one or more devices of system 100). For example, at least a portion of the database 125 may be internal and/or external to the sending unit 105, the receiving unit 110, and/or the control unit 120. In some embodiments, the user related content 161 may include, but is not limited to, user preferences, passwords, personal information, system information (e.g., model numbers, installation dates, etc.), content specification other components of system 100 including sending unit 105, receiving unit 110, control unit 120, and/or network 115, and/or information designated by the user and/or an administrator as related to the system.

Figure 2:
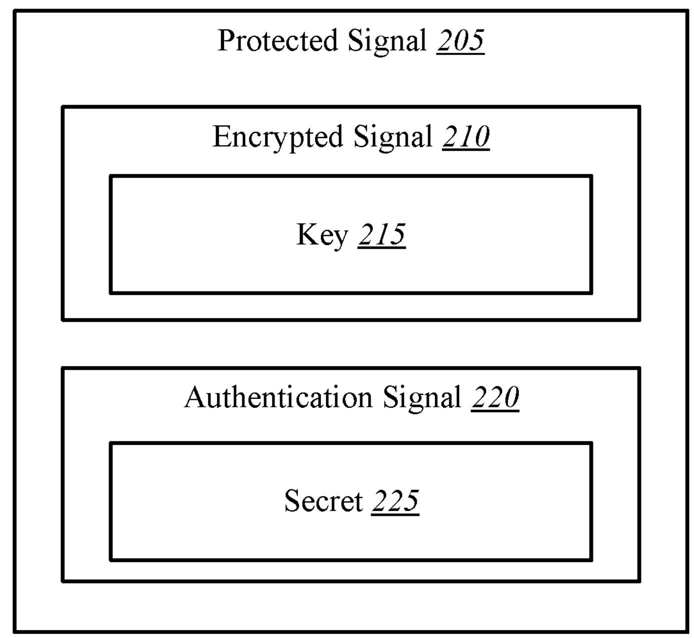
FIG. 2 depicts a block diagram of exemplary systems and methods suitable for implementing the present systems and methods.

In some embodiments, a protected signal including one or more data packets may be transmitted, analyzed, and/or have one or more actions performed on the protected signal. FIG. 2 is a block diagram illustrating one example of system 200, which may or may not include every part shown. As discussed in this disclosure, protected signal 205 may include an encrypted signal 210 which may include a key 215 and/or an authentication signal 220 and a secret 225. In some embodiments, protected signal 205 may include one or more data packets. Each of these one or more data packets—in whole or in part—may be encrypted creating encrypted signal 210. The one or more data packets may be encrypted using one or more keys 215. In some embodiments, protected signal 205 may include one or more data packets. Each of these one or more data packets in authentication signal 220—in whole or in part—may require authentication (i.e., may be hashed). The one or more data packets may include using one or more secrets 225.

Figure 3:
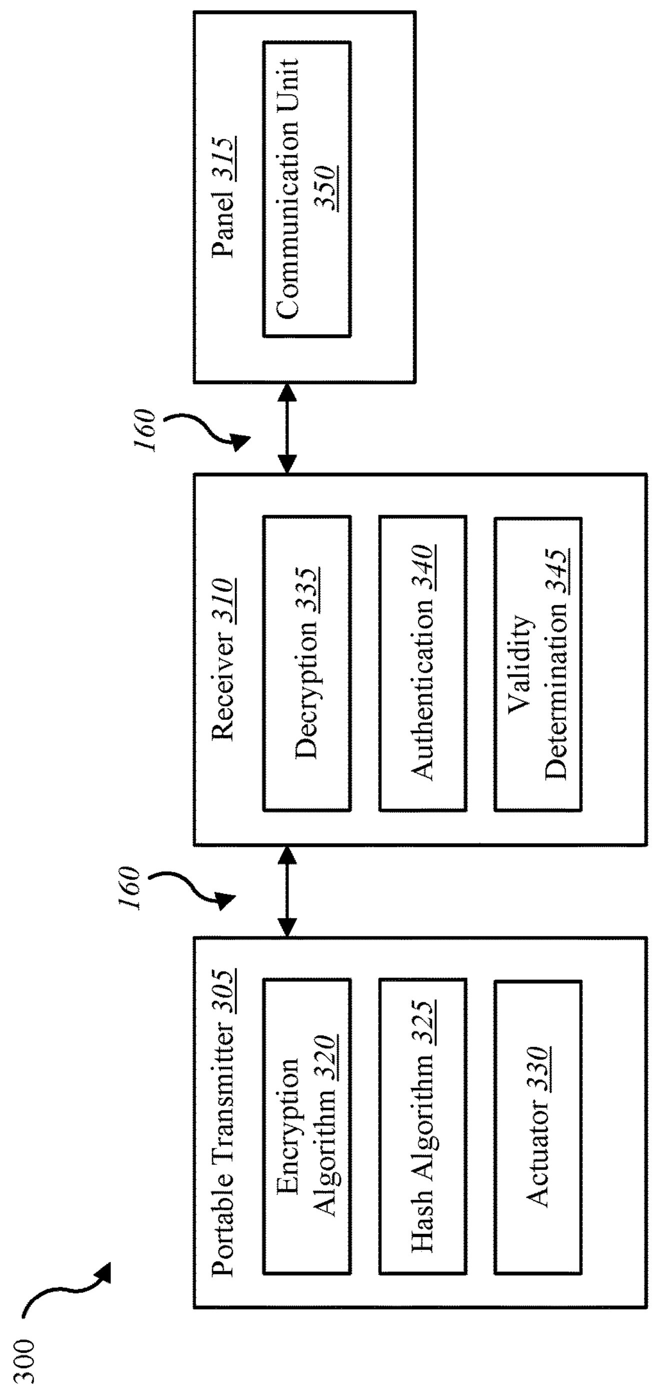
FIG. 3 depicts a block diagram of exemplary systems and methods suitable for implementing the present systems and methods.

FIG. 3 is a block diagram illustrating one example of system 300, which may include portable transmitter 305, receiver 310, and/or panel 315. In some embodiments, the portable transmitter 305 may include a key fob. In some embodiments, the portable transmitter 305 may encrypt one or more data packets using encryption algorithm 320 and/or require authentication using a hash algorithm 325. In some embodiments, the portable transmitter 305 may employ at least one of an encryption algorithm 320 and a hash algorithm 325 based at least in part on input received related to an actuator 330 (e.g., a button).

In some embodiments, the receiver 310 may perform a decryption 335 of a protected signal based at least in part on receiving information from and/or related to the portable transmitter 305. In some embodiments, the receiver 310 may perform authentication 340 of a protected signal based at least in part on receiving information from and/or related to the portable transmitter 305. In some embodiments, after performing at least one of decryption 335 and authentication 340, the receiver 310 may be able to make one or more validity determinations 345. In some embodiments, these validity determinations 345 may include verifying one or more pieces of information related to the encryption algorithm 320, hash algorithm 325, actuator 330, decryption 335, authentication 340, and/or other operations discussed with respect to systems 100, 200, 300, and/or others.

In some embodiments, a panel 315 may connect to the receiver 310 and/or the portable transmitter 305 via one or more connections 160. In some embodiments, the panel 315 may include a security system and/or home automation system panel. In some embodiments, the panel 315 may have been installed and set up prior to using the portable transmitter 305 and/or the receiver 310. In some embodiments, the communication unit 350 may receive a protected signal transmitted by at least one of portable transmitter 305 and/or receiver 310. In some embodiments, the communication unit 350 may receive a decrypted signal (decrypted using decryption 335) and/or an authenticated signal (authenticated using authentication 340) transmitted by at least one of portable transmitter 305 and/or receiver 310.

Figure 4:
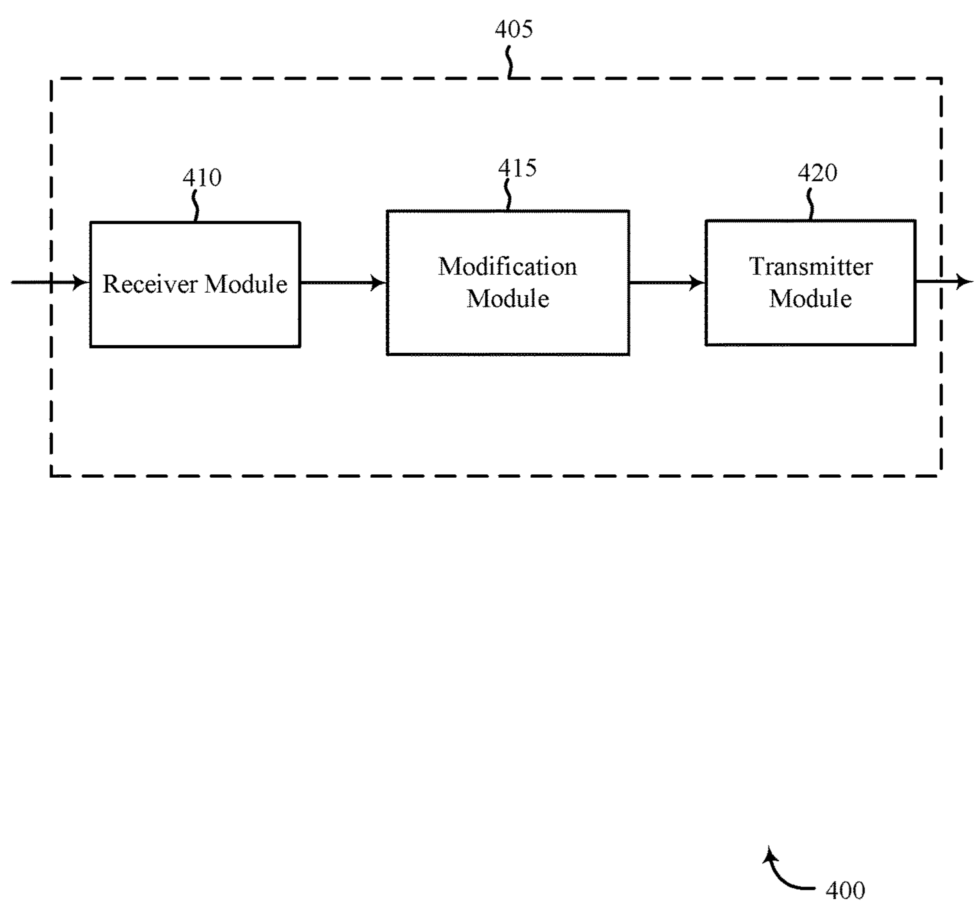
FIG. 4 depicts a block diagram of exemplary methods and systems suitable for implementing the present systems and methods.

FIG. 4 shows a block diagram 400 of a device 405 for use in electronic communication, in accordance with various aspects of this disclosure. The device 405 may be an example of one or more aspects of a control unit 120, sending unit 105, and/or receiving unit 110 described with reference to FIGS. 1-3. The device 405 may include a receiver module 410, a modification module 415, and/or a transmitter module 420. The device 405 may also be and/or include a processor. Each of these modules may be in communication with each other, directly and/or indirectly.

The components of the device 405 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The receiver module 410 may receive information such as packets, user data, and/or control information associated with various information channels (e.g., control channels, data channels, etc.). The receiver module 410 may be configured to receive a key serial number, a key, a secret, an encrypted data packet, a counter, a distance, an iteration value, and/or any other information. The receiver module 410 may receive GPS information, location information, biometric information, and the like. Information may be passed on to the modification module 415, and to other components of the device 405.

The modification module 415 may use authenticating data to modify at least one component of the automation system. The modification may comprise altering a status of a security system. The authentication and modification may occur when the receiving device (e.g. receiving unit 110) is within a predetermined distance (e.g. distance 163) from a residence where an automation and/or security system is in use. The distance may be a radius surrounding the residence or may comprise a geographical region or geo-fence surrounding a particular location. In some embodiments, upon authentication of a protected signal, the modification module 415 may initiate one or more changes to at least one component of an automation system. The changes may include disarming a security system, altering a status of lighting settings, altering one or more HVAC settings, unlocking/locking entryways, and the like. In some embodiments, the modification module 410 may require secondary authentication prior to modifying a component. For example, the modification module 410 may require a biometric identifier, a user code, or the like to be additionally authenticated prior to taking action. The additional authentication may provide additional security.

The transmitter module 420 may transmit the one or more signals received from other components of the device 405. The transmitter module 420 may be configured to receive a key serial number, a key, a secret, an encrypted data packet, a counter, a distance, an iteration value, and/or any other information. The transmitter module 420 may transmit GPS information, location information, biometric information, and the like. In some examples, the transmitter module 420 may be collocated with the receiver module 410 in a transceiver module.

Figure 5:
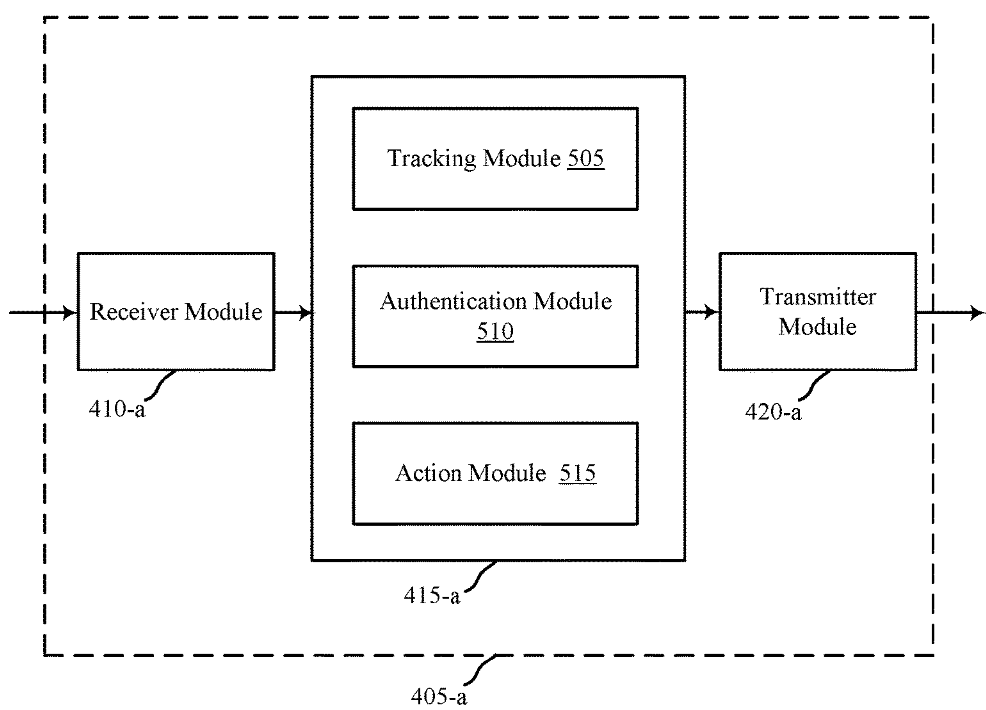
FIG. 5 depicts a block diagram of exemplary methods and systems suitable for implementing the present systems and methods.

FIG. 5 shows a block diagram 500 of a device 405-*a* for use in wireless communication, in accordance with various examples. The device 405-*a* may be an example of one or more aspects of a sending unit 105, receiving unit 110, and/or control unit 120 described with reference to FIGS. 1-3. Device 405-*a* may also be an example of a device 405 described with reference to FIG. 4. The device 405-*a* may include a receiver module 410-*a*, a modification module 415-*a*, and/or a transmitter module 420-*a*, which may be examples of the corresponding modules of device 405. The device 405-*a* may also include a processor. Each of these components may be in communication with each other. The modification module 415-*a* may include a tracking module 505, an authentication module 510, and an action module 515. The receiver module 410-*a* and the transmitter module 420-*a* may perform the functions of the receiver module 410 and the transmitter module 420 of FIG. 4, respectively.

The components of the device 405-*a* may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented—in whole or in part—with instructions embodied in memory formatted to be executed by one or more general and/or application-specific processors.

The tracking module 505 may establish a geographical region surrounding a residence. For example, the tracking module 505 may use GPS coordinates to establish a geo-fence surrounding a residence where an automation system is in use. The geo-fence may surround a predetermined geographical region as determined by a user of the automation system. In other embodiments, the geo-fence may align with a boundary of the property associated with the residence. In another instance, the geographical region may comprise a radius surrounding the residence. The radius and/or geo-fence may, in some instances, extend beyond the boundaries of the property associated with the property. For example, the geographical region may encompass a one-mile radius surrounding the residence. In other embodiments, the radius may be larger than or smaller than one mile.

The tracking module 505 may track a location of a user of the automation system. For example, the tracking module 505 may track the location of a receiving unit (e.g., receiving unit 110). The receiving unit, in some embodiments, may be a mobile device associated with the user. The mobile device may be identifiable by a mobile device identifier. The location may be determined via GPS coordinates of the receiving unit. For example, the tracking module 505 may occasionally ping the receiving unit for a GPS coordinate location. The tracking module 505 may compare the GPS coordinates associated with the receiving unit with coordinates of the geographical region to determine if the receiving unit is within a predetermined distance of the residence. In other embodiments, the receiving unit may send the tracking module 505 location information, such as GPS coordinates, only when the receiving unit is in motion. The receiving unit may detect motion via one or more sensors proximate the receiving unit. In still further embodiments, the tracking module 505 may determine that the receiving unit is within a predetermined distance of the residence when the receiving unit connects to a wireless network associated with the home residence.

The authentication module 510 may authenticate the receiving unit and/or user when the receiving unit and/or user enters the geographical region. For example, the sending unit may verify a key or other code received by the receiving unit. In other embodiments, the authentication module 510 may use a device identifier to verify the identity of the device. In still further embodiments, the authentication module 510 may connect and/or use an application or other program installed on the receiving unit to verify the user.

In further embodiments, the authentication module 510 may require secondary authentication of a user. Secondary authentication may require the user to enter a code into a control panel of the automation system. Secondary authentication may additionally and/or alternatively include biometric verification of the user. For example, the user may use a biometric identifier to unlock an entry to the residence. Biometric identifiers may include voice activation, fingerprint ID, and the like. In other embodiments, the authentication module 510 may require the user to speak an authentication code when the user enters the home. The authentication code may be a one-time use code in some examples, or may be a more permanent code in other examples. The authentication module 510 may send the one-time use code to the receiving unit when the tracking module 505 determines that the receiving unit is within a predetermined distance of the residence. The one-time use code may expire upon use or may expire after a predetermined period of time.

The action module 515 may take one or more actions associated with the automation system upon verification of the user. For example, if the security system is in an armed state, the action module 515 may disarm the security system upon authentication of the user. In other embodiments, the action module 515 may unlock and/or open an entry to the residence. For example, the action module 515 may unlock a front door and/or open a garage door. If the residence is gated, the action module 515 may open a gate to allow the user to enter the residence. The gate may be a personnel gate or may be a gate large enough for automobiles to pass through. In other instances, the action module 515 may turn on or off a plurality of lights, adjust an HVAC setting, activate or deactivate a component of the automation system, or any combination thereof.

The action taken by the action module 515 may be a secondary action based at least in part on a plurality of predetermined preferences inputted by the user associated with the receiving unit. For example, the user may request a security system to be deactivated and then a multitude of other actions to additionally and/or alternatively occur. For example, the user may input a preference indicating that only a few users may enter through a garage. Additionally and/or alternatively, each user may have a different routine when he approaches his residence. The secondary actions may be actions specific to the user to ensure the user returns to a residence that meets his specifications.

Figure 6:
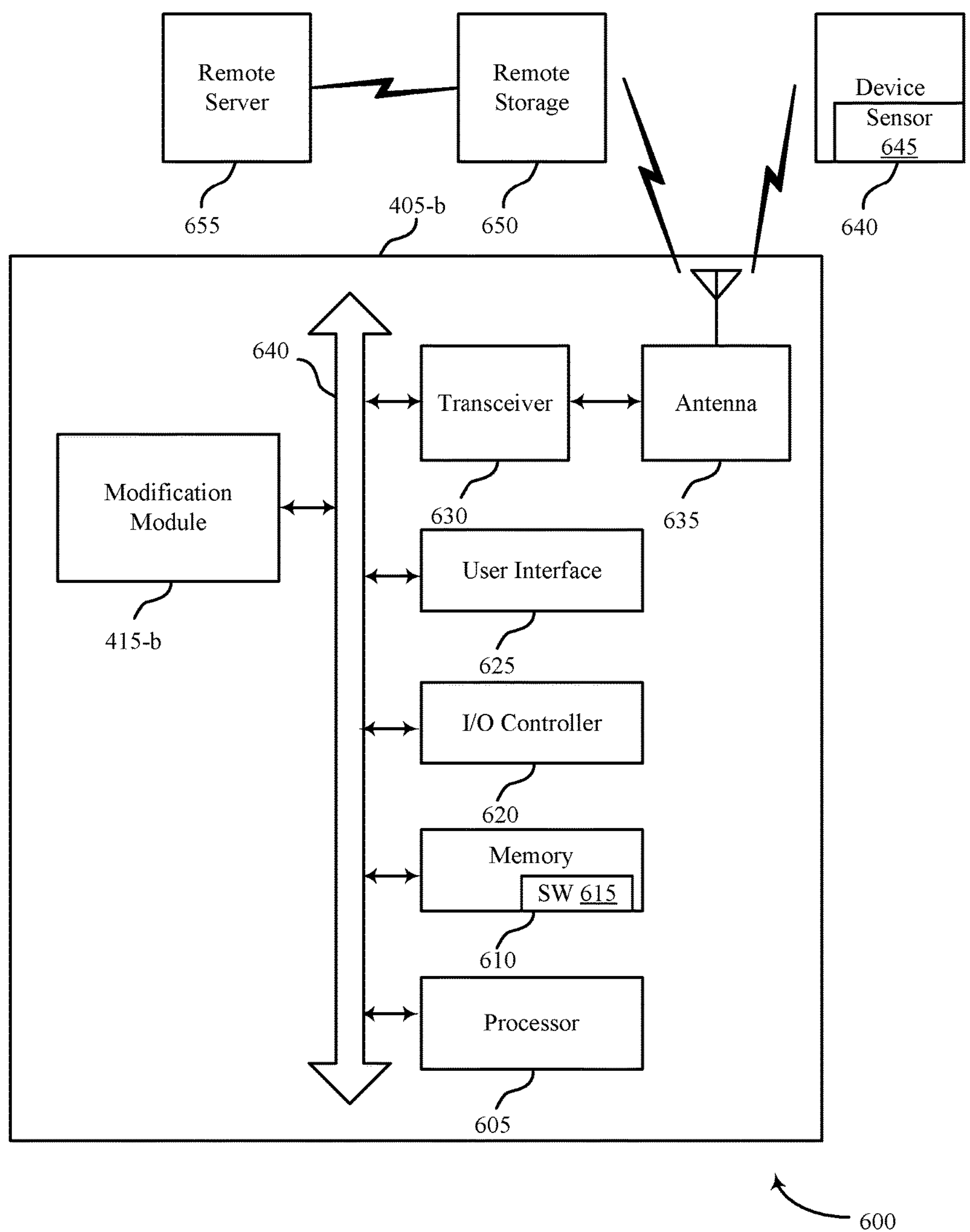
FIG. 6 depicts a block diagram of exemplary methods and systems suitable for implementing the present systems and methods.

FIG. 6 shows a system 600 for use in mobile supported disarming systems, in accordance with various examples. System 600 may include a device 405-*b*, which may be an example of the control unit 120, sending unit 105, and/or receiving unit 110 described with reference to FIGS. 1-3. The device 405-*b* may also be an example of one or more aspects of device 405 and/or 405-*a* of FIGS. 4 and 5.

Device 405-*b* may also include components for bi-directional voice and data communications including components for transmitting communications and components for receiving communications. For example, device 405-*b* may communicate bi-directionally with one or more of device 640, one or more sensors 645, remote storage 650, and/or remote server 655. This bi-directional communication may be direct (e.g., device 405-*b* communicating directly with remote storage 650) or indirect (e.g., device 405-*b* communicating indirectly with remote server 655 through remote storage 650).

Device 405-*b* may also include a processor module 605, and memory 610 (including software/firmware code (SW) 615), an input/output controller module 620, a user interface module 625, a transceiver module 630, and one or more antennas 635 each of which may communicate—directly or indirectly—with one another (e.g., via one or more buses 640). The transceiver module 630 may communicate bi-directionally—via the one or more antennas 635, wired links, and/or wireless links—with one or more networks or remote devices as described above. For example, the transceiver module 630 may communicate bi-directionally with one or more of device 640, remote storage 650, and/or remote server 655. The transceiver module 630 may include a modem to modulate the packets and provide the modulated packets to the one or more antennas 635 for transmission, and to demodulate packets received from the one or more antenna 635. While a device (e.g., 405-*b*) may include a single antenna 635, the device may also have multiple antennas 635 capable of concurrently transmitting or receiving multiple wired and/or wireless transmissions. In some embodiments, one element of device 405-*b* (e.g., one or more antennas 635, transceiver module 630, etc.) may provide a direct connection to a remote server 655 via a direct network link to the Internet via a POP (point of presence). In some embodiments, one element of device 405-*b* (e.g., one or more antennas 635, transceiver module 630, etc.) may provide a connection using wireless techniques, including digital cellular telephone connection, Cellular Digital Packet Data (CDPD) connection, digital satellite data connection, and/or another connection.

The signals associated with system 600 may include wireless communication signals such as radio frequency, electromagnetics, local area network (LAN), wide area network (WAN), virtual private network (VPN), wireless network (using 802.11, for example), 345 MHz, Z-WAVE®, cellular network (using 3G and/or LTE, for example), and/or other signals. The one or more antennas 635 and/or transceiver module 630 may include or be related to, but are not limited to, WWAN (GSM, CDMA, and WCDMA), WLAN (including BLUETOOTH® and Wi-Fi), WMAN (WiMAX), antennas for mobile communications, antennas for Wireless Personal Area Network (WPAN) applications (including RFID and UWB). In some embodiments, each antenna 635 may receive signals or information specific and/or exclusive to itself. In other embodiments, each antenna 635 may receive signals or information not specific or exclusive to itself.

In some embodiments, one or more sensors 645 (e.g., motion, proximity, smoke, light, glass break, door, window, carbon monoxide, and/or another sensor) may connect to some element of system 600 via a network using one or more wired and/or wireless connections.

In some embodiments, the user interface module 625 may include an audio device, such as an external speaker system, an external display device such as a display screen, and/or an input device (e.g., remote control device interfaced with the user interface module 625 directly and/or through I/O controller module 620).

One or more buses 640 may allow data communication between one or more elements of device 405-*b* (e.g., processor module 605, memory 610, I/O controller module 620, user interface module 625, etc.).

The memory 610 may include random access memory (RAM), read only memory (ROM), flash RAM, and/or other types. The memory 610 may store computer-readable, computer-executable software/firmware code 615 including instructions that, when executed, cause the processor module 605 to perform various functions described in this disclosure (e.g., track a location of a receiving unit, authenticate a receiving unit, alter a status of one or more components of the automation system, etc.). Alternatively, the software/firmware code 615 may not be directly executable by the processor module 605 but may cause a computer (e.g., when compiled and executed) to perform functions described herein. Alternatively, the computer-readable, computer-executable software/firmware code 615 may not be directly executable by the processor module 605 but may be configured to cause a computer (e.g., when compiled and executed) to perform functions described herein. The processor module 605 may include an intelligent hardware device, e.g., a central processing unit (CPU), a microcontroller, an application-specific integrated circuit (ASIC), etc.

In some embodiments, the memory 610 can contain, among other things, the Basic Input-Output system (BIOS) which may control basic hardware and/or software operation such as the interaction with peripheral components or devices. For example, the modification module 415-*b* to implement the present systems and methods may be stored within the system memory 610. Applications resident with system 600 are generally stored on and accessed via a non-transitory computer readable medium, such as a hard disk drive or other storage medium. Additionally, applications can be in the form of electronic signals modulated in accordance with the application and data communication technology when accessed via a network interface (e.g., transceiver module 630, one or more antennas 635, etc.).

Many other devices and/or subsystems may be connected to, or may be included as, one or more elements of system 600 (e.g., entertainment system, computing device, remote cameras, wireless key fob, wall mounted user interface device, cell radio module, battery, alarm siren, door lock, lighting system, thermostat, home appliance monitor, utility equipment monitor, and so on). In some embodiments, all of the elements shown in FIG. 6 need not be present to practice the present systems and methods. The devices and subsystems may be interconnected in different ways from that shown in FIG. 6. In some embodiments, an aspect of some operation of a system, such as that shown in FIG. 6, may be readily known in the art and are not discussed in detail in this application. Code to implement the present disclosure may be stored in a non-transitory computer-readable medium such as one or more of system memory 610 or other memory. The operating system provided on I/O controller module 620 may be iOS®, ANDROID®, MS-DOS®, MS-WINDOWS®, OS/2®, UNIX®, LINUX®, or another known operating system.

The transceiver module 630 may include a modem configured to modulate the packets and provide the modulated packets to the antennas 635 for transmission and/or to demodulate packets received from the antennas 635. While the control panel or control device (e.g., 205-*b*) may include a single antenna 635, the control panel or control device (e.g., 205-*b*) may have multiple antennas 635 capable of concurrently transmitting and/or receiving multiple wireless transmissions.

The device 405-*b* may include a modification module 415-*b*, which may perform the functions described above for the modification module 415 of device 405 of FIGS. 4 and 5. The device 405-*b* may also include an activation module (e.g., activation module 131), communication module (e.g. communication module 133, 141, or 155), protected signal module (e.g., protected signal module 137 or 145), user feedback module (e.g., user feedback module 139), processing module (e.g. processing module 147 or 157), comparison module (e.g. comparison module 149 or 157), and the like.

Figure 7:
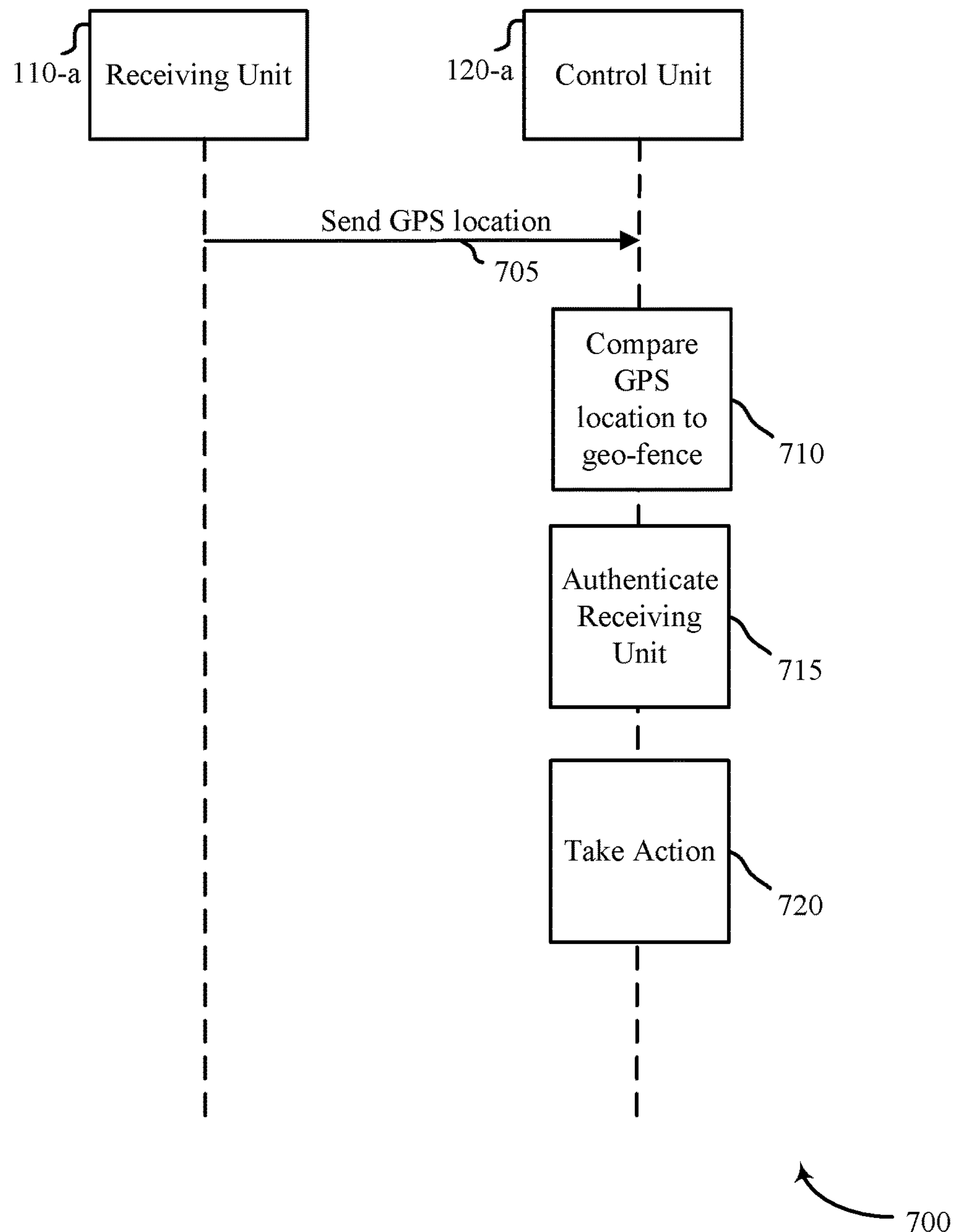
FIG. 7 depicts a swim diagram of exemplary methods and systems suitable for implementing the present systems and methods.

FIG. 7 shows an exemplary swim diagram 700 relating to mobile supported disarming of automation systems. The diagram 700 may include a receiving unit 110-*a* and a control unit 120-*a*. The receiving unit 110-*a* may be an example of receiving unit 110 described with reference to FIG. 1. The control unit 120-*a* may be an example of control unit 120 described with reference to FIG. 1. The receiving unit 110-*a* and/or control unit 120-*a* may additionally and/or alternatively include embodiments of device 405 described with reference to FIGS. 4-6.

In one embodiment, the receiving unit 110-*a* may send a GPS location 705 to the control unit 120-*a*. The GPS location may include GPS coordinates of the receiving unit 110-*a*. The receiving unit 110-*a* may periodically send the control unit 120-*a* GPS coordinates or may only send the control unit 120-*a* GPS coordinate when the receiving unit 110-*a* is in motion. In alternative embodiments, the control unit 120-*a* may determine a location of the receiving unit 110-*a* when the receiving unit 110-*a* connects to a wireless network associated with a residence where the control unit 120-*a* is in use.

In some embodiments, the control unit 120-*a* may compare the GPS location to a geo-fence 710 associated with the residence. The control unit 120-*a* may determine a proximity of the receiving unit 110-*a* to the residence. If the receiving unit 110-*a* is within a predetermined distance of the residence, the control unit may authenticate 715 the receiving unit 110-*a*. Authentication may include a unique one-time use code, a unique identifier associated with the receiving unit 110-*a*, a biometric identifier of the user, and the like.

Once the device is authenticated, the control unit 120-*a* may take action 720. The action taken may include deactivating an active alarm state of the automation system. The action may additionally include disarming an alarm associated with the automation system, or unlocking at least one door in the residence, or deactivating an audio and/or video monitoring system, or a combination thereof. In some embodiments, actions may include turning on or off a plurality of lights, or adjusting a thermostat, or activating or deactivating a component of the security and/or automation systems, or a combination thereof.

Figure 8:
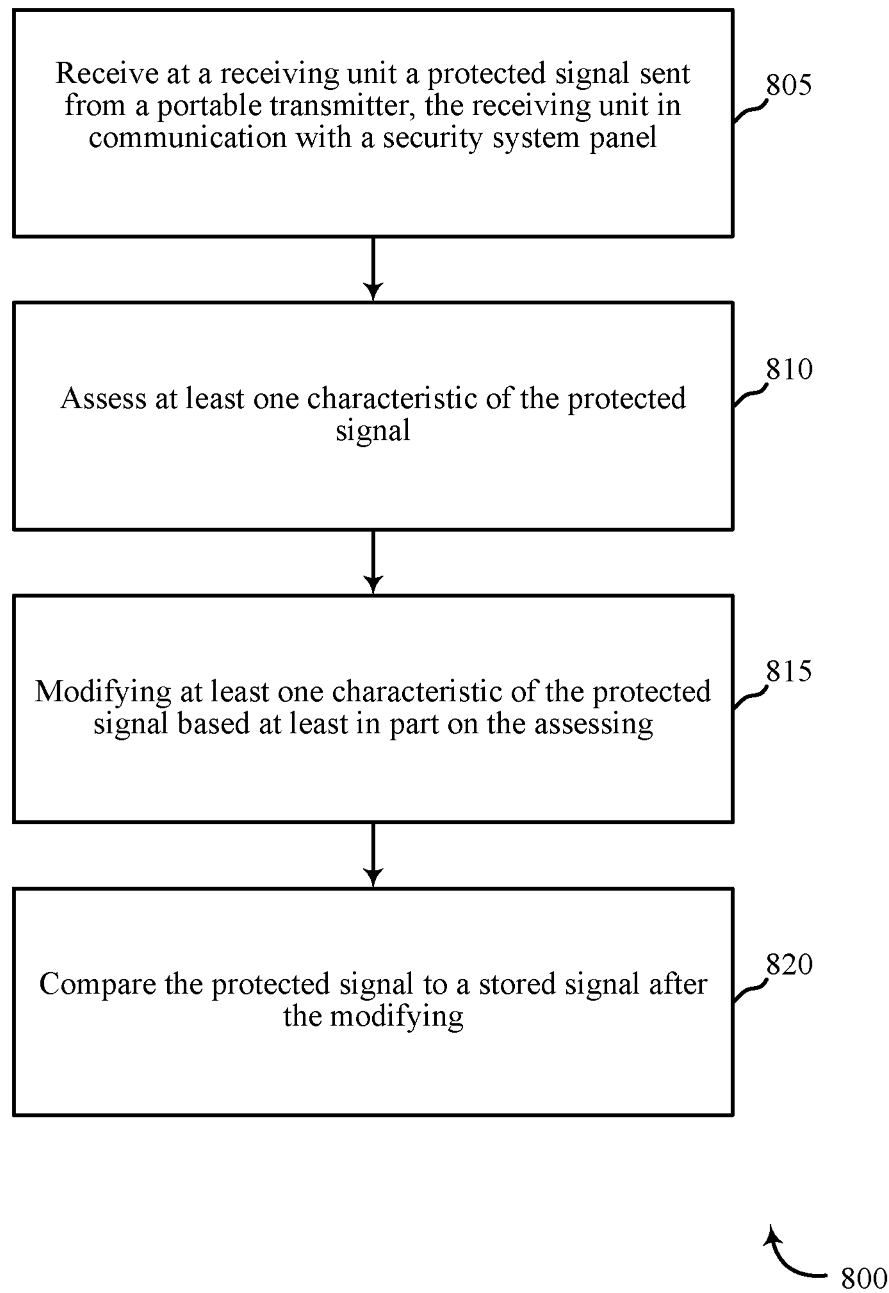
FIG. 8 depicts a flow diagram of exemplary methods and systems suitable for implementing the present systems and methods.

FIG. 8 shows exemplary methods 800 and systems in accordance with some embodiments. In some embodiments, a method incorporating the present systems and methods may include receiving, at a receiving unit, a protected signal sent from a portable transmitter, the receiving unit in communication with a security system panel, assessing at least one characteristic of the protected signal, modifying at least one characteristic of the protected signal based at least in part on the assessing, and/or comparing the protected signal to a stored signal after the modifying—as shown in blocks 805, 810, 815, and 820. In some embodiments, any and/or all of these operations may be performed by or at the sending unit, the receiving unit, the control unit, the network, the database, the panel, and/or other components.

In some embodiments, a protected signal may include an encrypted and/or hashed (requiring authentication) signal. As shown in FIG. 8, when a protected signal is received by a receiving unit (or another component of the system), the receiving unit (or other component of the system) may assess the protected signal. In some embodiments, this assessment may include determining whether the protected signal includes an encryption, a hash, a key, a secret, and/or other information. In some embodiments, the protected signal may only include one or more encrypted portions or one or more hashed portions—not both.

In some embodiments, modifying at least one characteristic of the protected signal based at least in part on the assessing may include decrypting at least a portion of the protected signal. In some embodiments, modifying at least one characteristic of the protected signal based at least in part on the assessing may include authenticating at least a portion of the protected signal. In some embodiments, modifying at least one characteristic of the protected signal based at least in part on the assessing may include changing, advancing, resetting, and/or reordering one or more protected signal parts such as an encrypted portion, a non-encrypted portion, a hashed portion, a non-hashed portion, a key serial number portion, a non-key serial number portion, and/or other protected signal parts.

In some embodiments, comparing the protected signal to a stored signal after the modifying may include comparing a protected signal received at a receiving unit with a signal stored by one or more components, including but not limited to the receiving unit. In some embodiments, comparing the protected signal to a stored signal after the modifying may include validating at least a portion of the protected signal based on one or more parameters. These one or more parameters may, In some embodiments, relate to an encrypted portion and/or a hashed portion of the protected signal. In some embodiments, comparing may include comparing one or more specific sections (e.g., bytes and/or bits) of a protected signal with other information—stored and/or related to one or more components, such as receiving unit. In some embodiments, comparing may include correlating at least a portion of the protected signal with another signal. In some embodiments, comparing may include correlating at least a portion of the protected signal with another protected signal or the same protected signal but referenced from a different time period.

Figure 9:
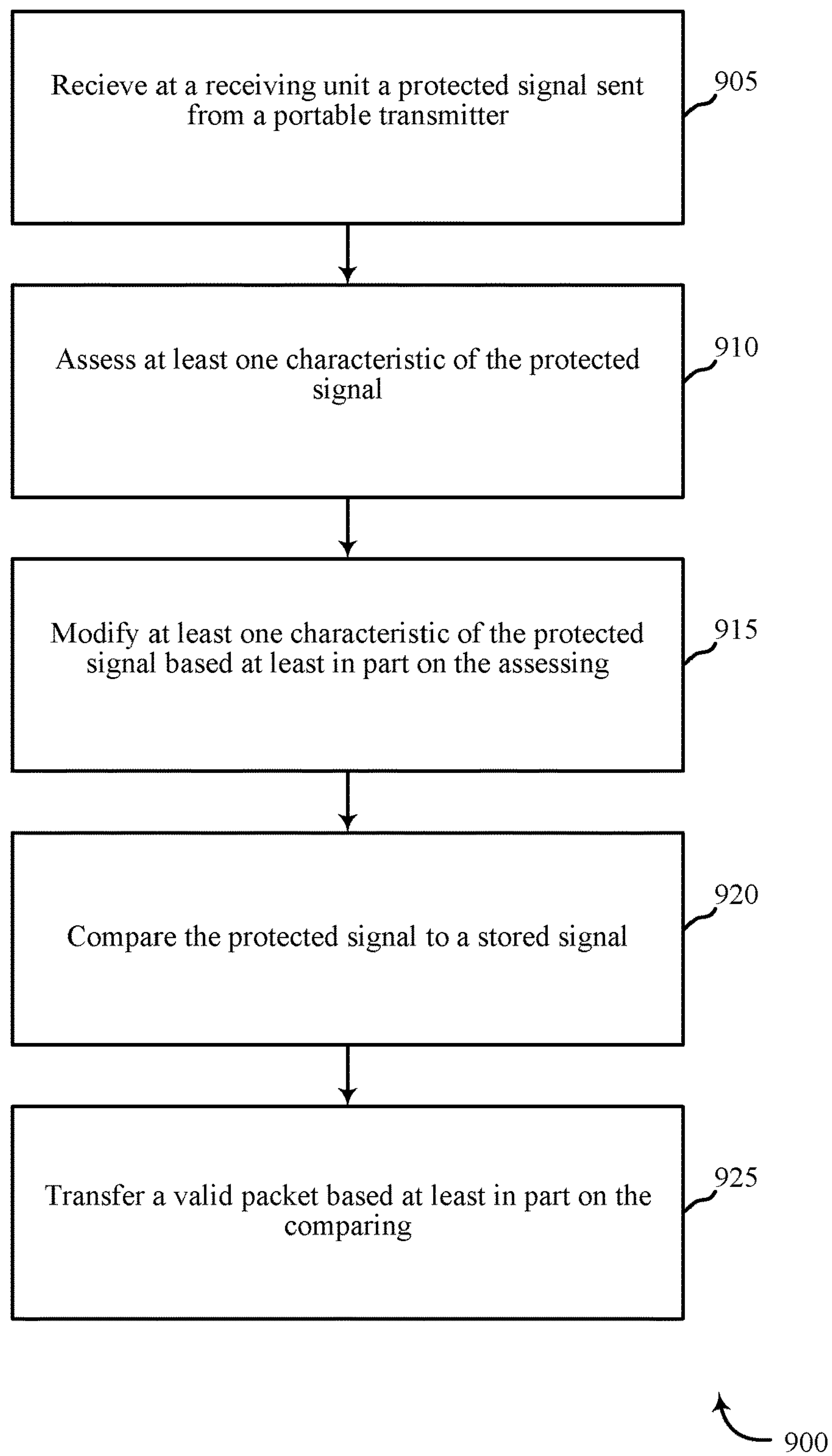
FIG. 9 depicts a flow diagram of exemplary methods and systems suitable for implementing the present systems and methods

FIG. 9 shows exemplary method 900 in accordance with some embodiments. In some embodiments, a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal, and/or transferring a valid packet based at least in part on the comparing—as shown in blocks 905, 910, 915, 920, and 925. In some embodiments, any and/or all of these operations may be performed by or at the sending unit, the receiving unit, the control unit, the network, the database, the panel, and/or other components.

In some embodiments, the receiving unit may be in communication—directly or indirectly—with a security system panel. In some embodiments, comparing the protected signal to a stored signal may occur before, during, and/or after other method steps. For example, comparing the protected signal to a stored signal may occur after assessing at least one characteristic of the protected signal but before modifying at least one characteristic of the protected signal based at least in part on the assessing.

In some embodiments, transferring a valid packet may include transferring the valid packet from the receiving unit to the panel. In some embodiments, transferring a valid packet may include transferring the valid packet from the receiving unit to any component associated with a system (e.g., system 100), including a control device.

In some embodiments, if comparing the protected signal to a stored signal shows the protected signal (in whole or in part) is invalid, then the system may perform one or more other steps. In some embodiments, the invalid packet may be transmitted back to the component that it was received from. In some embodiments, the invalid packet may be transmitted back to a different component than the component from which the invalid packet was received. In some embodiments, determining that a packet is invalid or has one or more different characteristics from the stored signal may trigger one or more system components to act in a different state, such as an alarm mode. In some embodiments, determining that a packet is invalid or has one or more different characteristics from the stored signal may trigger one or more system components to send a notification and/or an alert to one or more system components.

Figure 10:
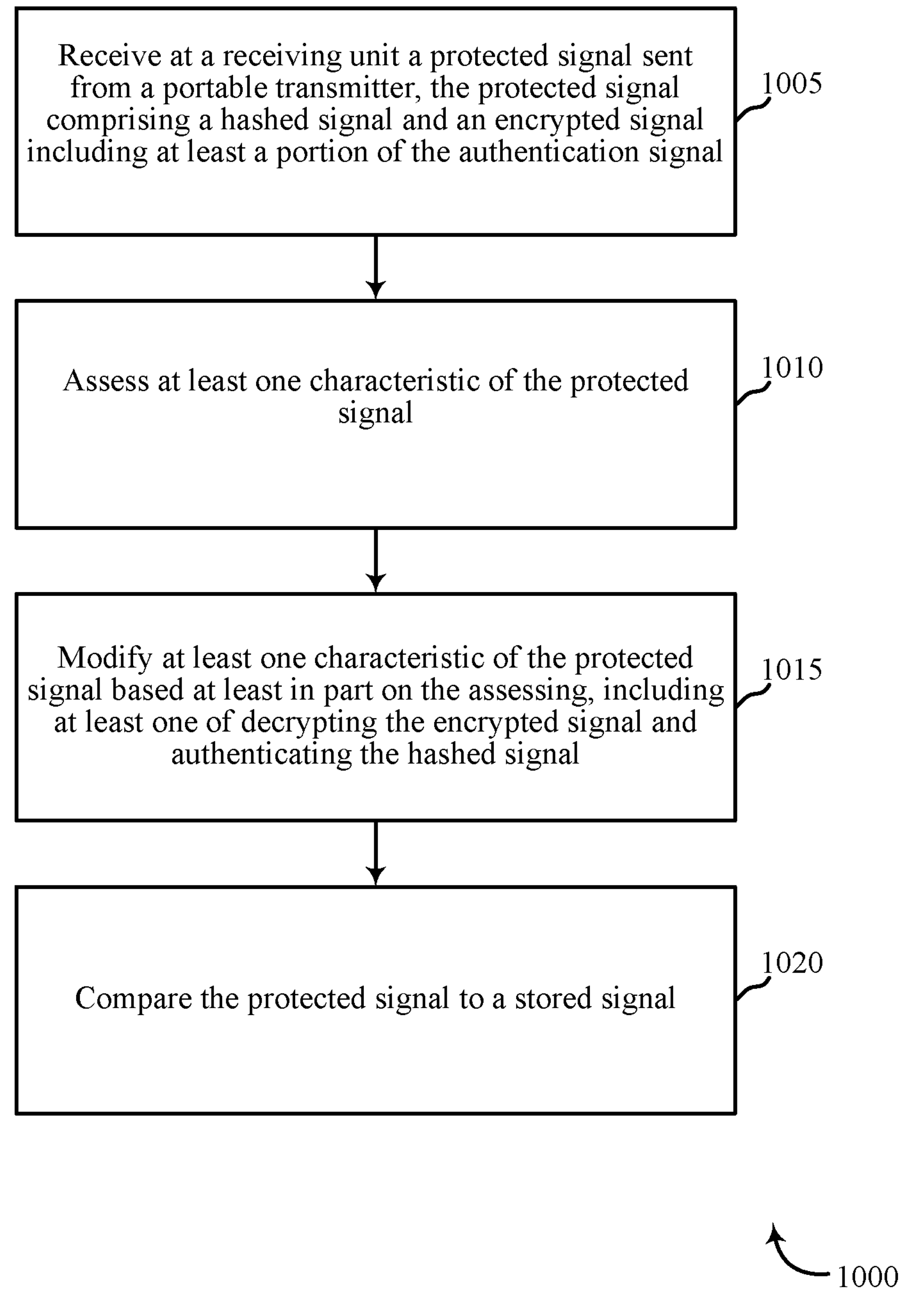
FIG. 10 depicts a flow diagram of exemplary methods and systems suitable for implementing the present systems and methods.

FIG. 10 shows exemplary method 1000 in accordance with some embodiments. In some embodiments, a method incorporating the present systems and methods may include receiving at a receiving unit a protected signal sent from a portable transmitter, the protected signal comprising a hashed signal and an encrypted signal including at least a portion of the authentication signal, assessing at least one characteristic of the protected signal, modifying at least one characteristic of the protected signal based at least in part on the assessing, including at least one of decrypting the encrypted signal and authenticating the hashed signal, and/or comparing the protected signal to a stored signal—as shown in blocks 1005, 1010, 1015, and 1020. In some embodiments, any and/or all of these operations may be performed by or at the sending unit, the receiving unit, the control unit, the network, the database, the panel, and/or other components.

As disclosed in FIG. 2, In some embodiments, the protected signal may include an encrypted signal and/or a hashed signal requiring authentication—each comprising a portion of the protected signal. In some embodiments, the protected signal may include an encrypted signal and a hashed signal requiring authentication, where at least a portion of the encrypted signal and the hashed signal overlap and/or are included together. For example, at least some of the same bytes of the protected signal may be encrypted (e.g., bytes 1-4) and also may require authentication (e.g., bytes 2-4).

Figure 11:
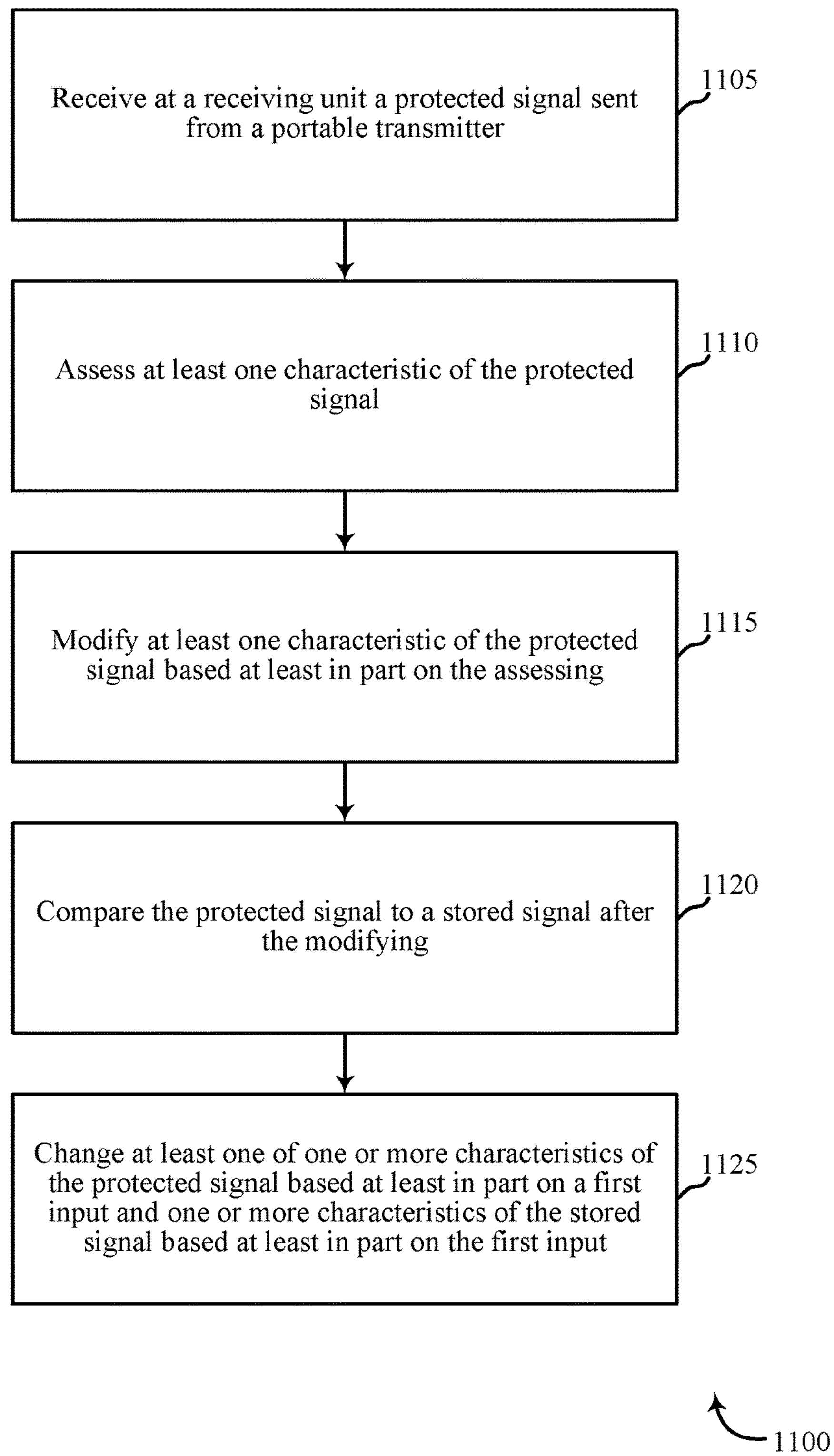
FIG. 11 depicts a flow diagram of exemplary methods and systems suitable for implementing the present systems and methods.

FIG. 11 shows exemplary method 1100 in accordance with some embodiments. In some embodiments, a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal after the modifying, and/or changing at least one of one or more characteristics of the protected signal based at least in part on a first input and/or one or more characteristics of the stored signal based at least in part on the first input—as shown in blocks 1105, 1110, 1115, 1120, and 1125. In some embodiments, any and/or all of these operations may be performed by or at the sending unit, the receiving unit, the control unit, the network, the database, the panel, and/or other components.

In some embodiments, changing at least one of one or more characteristics of the protected signal may be based at least in part on a first input, as discussed throughout this disclosure. For example, this input may include a user input, which may include but is not limited to a user activating one or more activation modules (i.e., actuating one or more buttons). In some embodiments, this input may also or alternatively include any input transmitted and/or received by one or more of a sending unit, a receiving unit, a control unit, a database, a portable transmitter, a panel, and/or other system components and/or elements.

In some embodiments, the sending unit may change one or more characteristics of the protected signal based at least in part on a first input and/or a second input. In some embodiments, the receiving unit may change one or more characteristics of the stored signal based at least in part on the first input and/or the second input. In some embodiments, a method may include changing at least one of the protected signal and the stored signal based at least in part on one of the first input and/or the second input.

In some embodiments, the one or more characteristics may include a key, a secret, a key serial number, information related to encryption, information related to authentication, information related to a protected signal, one or more components of a system (e.g., a sending unit, a receiving unit, a control unit, a database, a portable transmitter, a panel), and/or other related characteristics. In some embodiments, based at least in part on the first input, at least one of one or more characteristics of the protected signal may be changed. In some embodiments, based at least in part on the first input, at least one of one or more characteristics of the stored signal may be changed.

Figure 12:
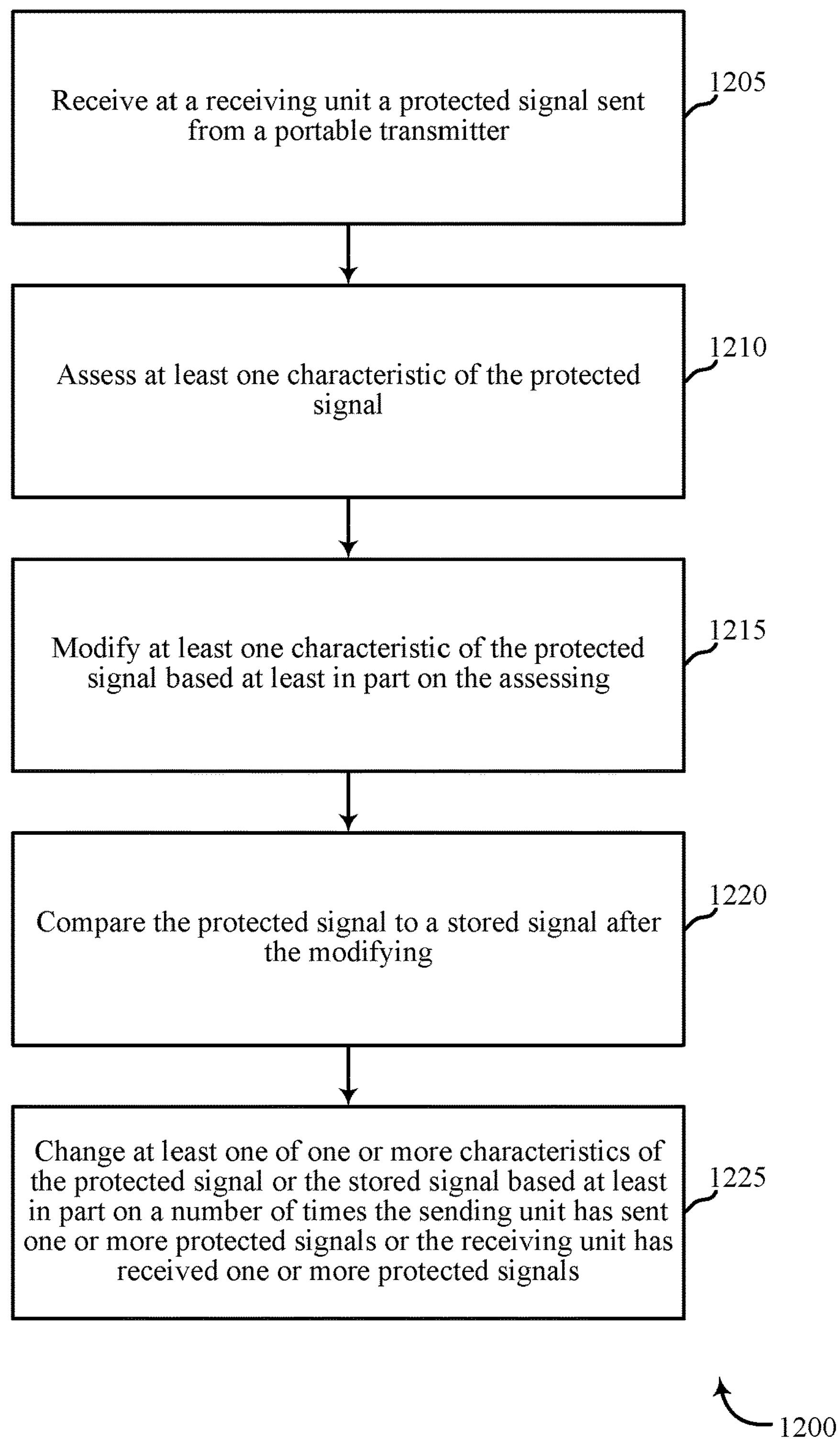
FIG. 12 depicts a flow diagram of exemplary methods and systems suitable for implementing the present systems and methods.

FIG. 12 shows exemplary method 1200 in accordance with some embodiments. In some embodiments, a method incorporating the present systems and methods may include receiving at a receiving unit a protected signal sent from a portable transmitter, assessing at least one characteristic of the protected signal, modifying at least one characteristic of the protected signal based at least in part on the assessing, comparing the protected signal to a stored signal after the modifying, and/or changing at least one of one or more characteristics of the protected signal or the stored signal based at least in part on a number of times the sending unit has sent one or more protected signals or the receiving unit has received one or more protected signals—as shown in blocks 1205, 1210, 1215, 1220, and 1225. In some embodiments, any and/or all of these operations may be performed by or at the sending unit, the receiving unit, the control unit, the network, the database, the panel, and/or other components.

In some embodiments, the system may be able to provide a protected signal having an encryption, a hash requiring authentication, and changing at least one of one or more characteristics of the protected signal based at least in part on a first input, which may or may not include a number of times the sending unit has sent one or more protected signals or the receiving unit has received one or more protected signals.

Figure 13:
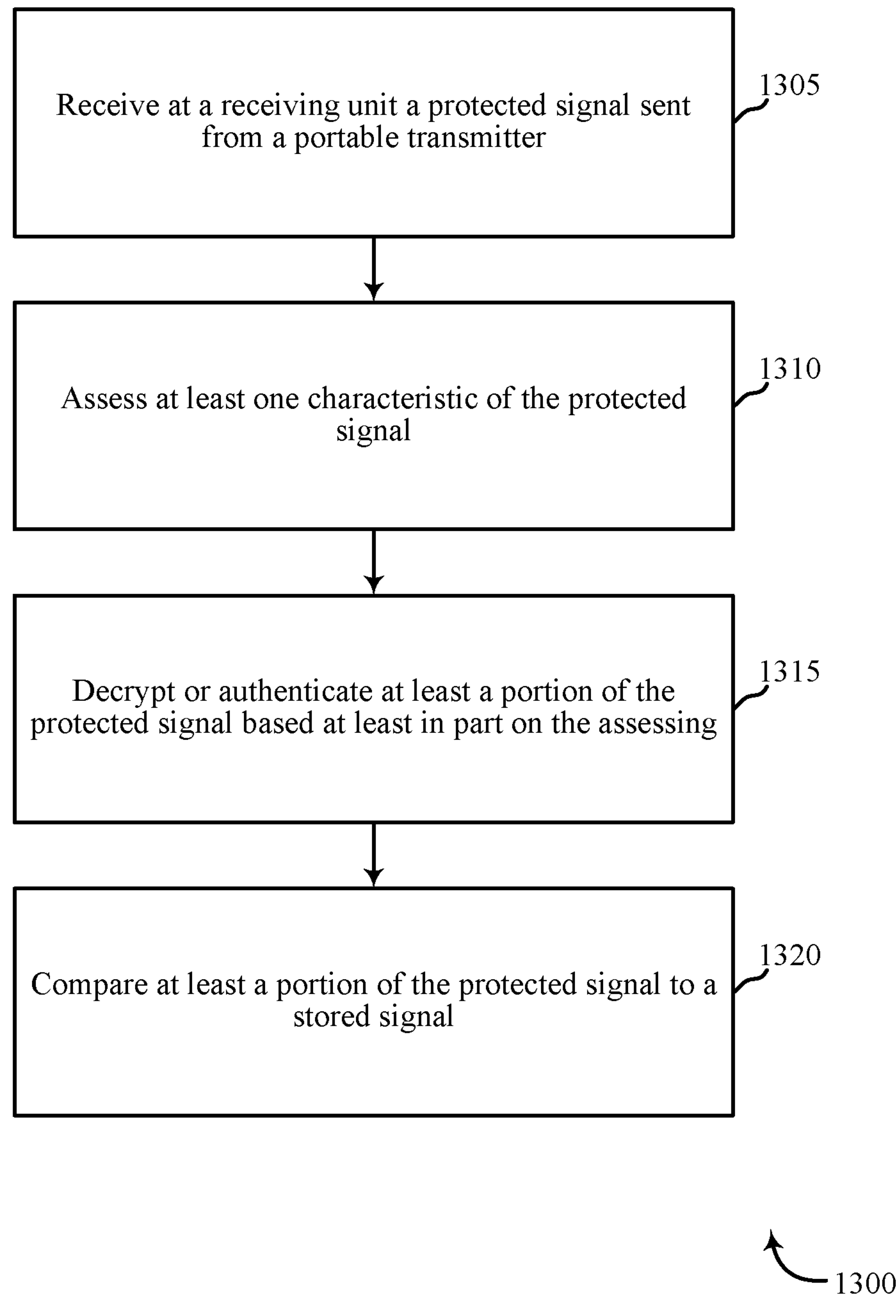
FIG. 13 depicts a flow diagram of exemplary methods and systems suitable for implementing the present systems and methods.

FIG. 13 shows exemplary method 1300 in accordance with some embodiments. In some embodiments, a method incorporating the present systems and methods may include receiving at a receiving unit a protected signal generated by and sent from a portable transmitter, assessing at least one characteristic of the protected signal, decrypting or authenticating at least a portion of the protected signal based at least in part on the assessing, and/or comparing the protected signal to a stored signal as shown in blocks 1305, 1310, 1315, and 1320. In some embodiments, any and/or all of these operations may be performed by or at the sending unit, the receiving unit, the control unit, the network, the database, the panel, and/or other components.

In some embodiments, the portable transmitter may generate a protected signal, while in other embodiments, the protected signal may be generated by a different system component and/or element (e.g., a receiving unit and/or a control device). In some embodiments, the receiving unit may decrypt and/or authenticate at least a portion of the protected signal based at least in part on an assessment (performed by the receiving unit and/or another system component and/or element), while In other embodiments, the protected signal may be decrypted and/or authenticated by a different system component and/or element (e.g., a sending unit and/or a control device). In some embodiments, a sending unit may include a portable transmitter, such as a key fob.

In some embodiments, the system and/or methods may include functions related to user devices. In some embodiments, a user may access one or more functions of at least one of a sending unit, a receiving unit, a control unit, a database, a network, and/or any other device related to a system from a computing device. For example, In some embodiments, the computing device may include a mobile application that interfaces with one or more functions of a sending unit, a receiving unit, a control unit, a database, a network, and/or any other device related to a system.

Figure 14:
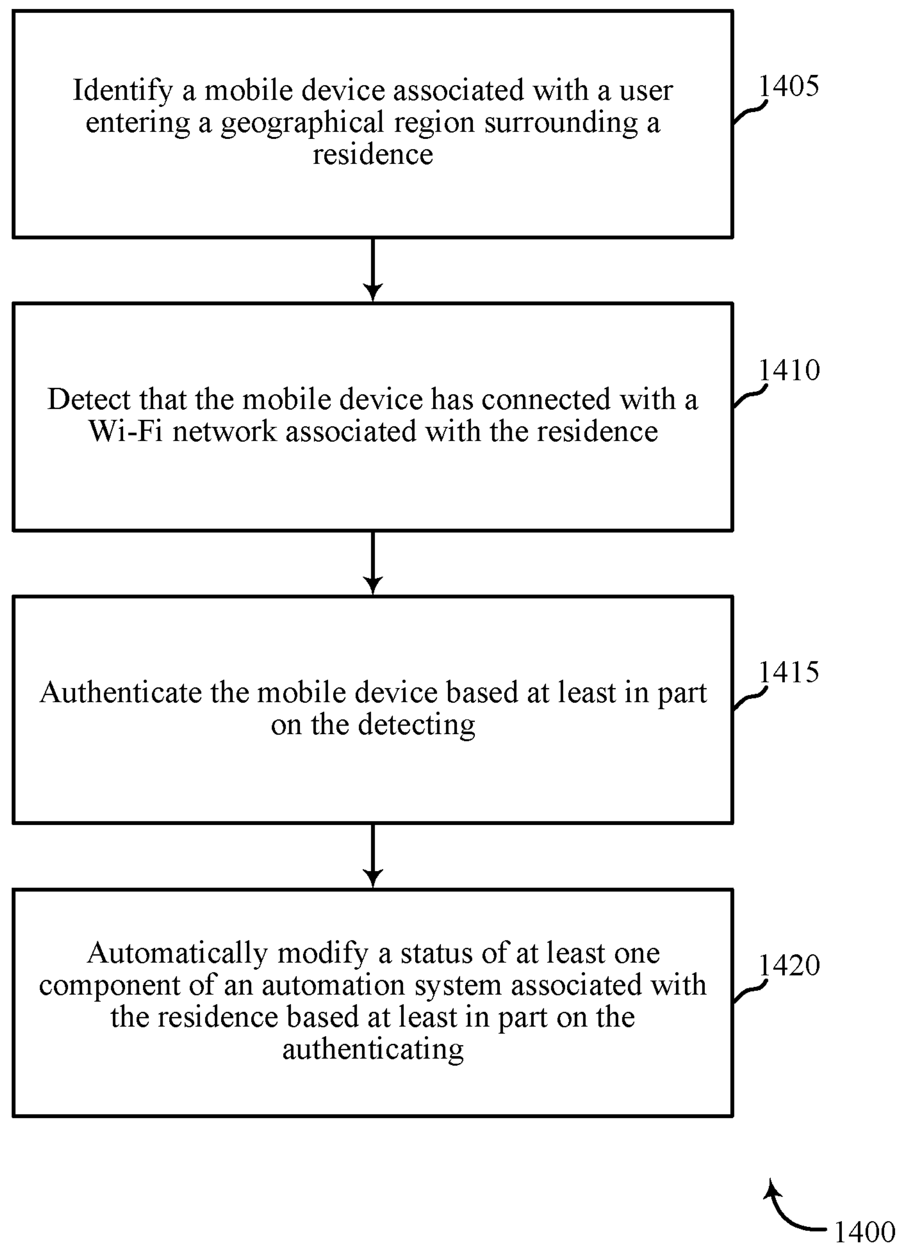
FIG. 14 depicts a flow diagram of exemplary methods and systems suitable for implementing the present systems and methods.

FIG. 14 is a flow chart illustrating an example of a method 1400 for mobile supported disarming of an automation system, in accordance with various aspects of the present disclosure. For clarity, the method 1400 is described below with reference to aspects of one or more of the device 405 described with reference to FIGS. 4-7, and/or aspects of one or more of the receiving unit 110, sending unit 105, and/or control unit 120 described with reference to FIG. 1. In some examples, a control unit 120 may execute one or more sets of codes to control the functional elements of the receiving unit 110 to perform the functions described below. Additionally or alternatively, receiving unit 110 may perform one or more of the functions described below using special-purpose hardware.

At block 1405, the method 1400 may include identifying a mobile device associated with a user entering a geographical region surrounding a residence. For example, the method 1400 may actively track a location of a mobile device (e.g. a receiving unit). The method may compare the location to a geographical region or a geo-fence surrounding a residence associated with the automation system. In some embodiments, at block 1410, the method 1400 may include detecting that the mobile device has connected with a Wi-Fi network associated with the residence. The connection may positively identify where the mobile device is in relation to the residence. This may prompt the method 1400 to take additional actions.

The operation(s) at blocks 1405, 1410 may be performed using the tracking module 505 described with reference to FIG. 5.

At block 1415, the method 1400 may include authenticate the mobile device based at least in part on the detecting. The authentication may include verifying a key or hash on the mobile device. It may additionally and/or alternatively include verifying a mobile device identifier. In some embodiments, it may include secondary verification such as a biometric identifier, user code, one-time use code, and the like.

The operation(s) at block 1415 may be performed using the authentication module 510 described with reference to FIG. 5.

At block 1420, the method 1400 may include automatically modifying a status of at least one component of a residence based at least in part on the authenticating. This may include modifying a status of a security setting of the automation system. For example, if the security system is armed, the method 1400 may disarm the system. The method 1400 may additionally and/or alternatively unlock and/or automatically open an entry to the residence including a garage door and/or gate to the premises.

The operation(s) at block 1420 may be performed using the action module 515 described with reference to FIG. 5.

Thus, the method 1400 may provide for mobile supported disarming relating to automation/security systems. It should be noted that the method 1400 is just one implementation and that the operations of the method 1400 may be rearranged or otherwise modified such that other implementations are possible.

Figure 15:
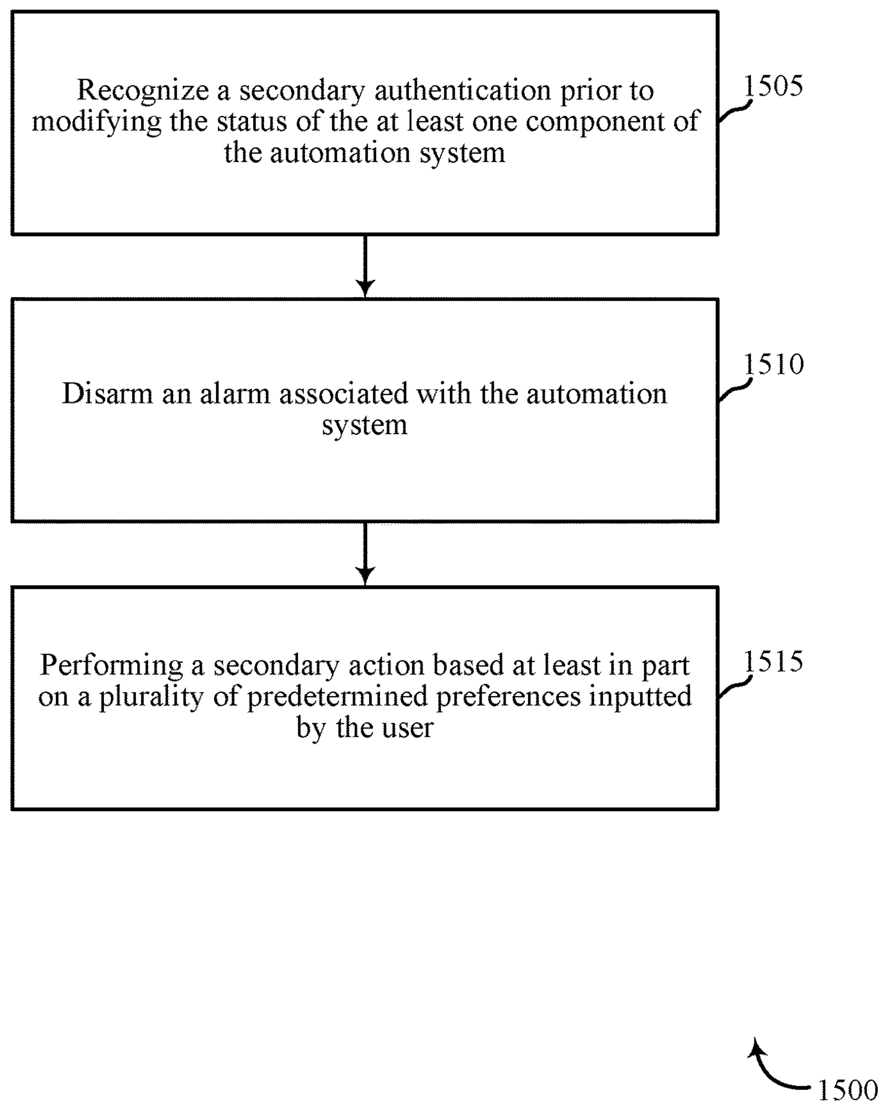
FIG. 15 depicts a flow diagram of exemplary methods and systems suitable for implementing the present systems and methods.

FIG. 15 is a flow chart illustrating an example of a method 1500 for mobile supported disarming of an automation system, in accordance with various aspects of the present disclosure. For clarity, the method 1500 is described below with reference to aspects of one or more of the device 405 described with reference to FIGS. 4-7, and/or aspects of one or more of the receiving unit 110, sending unit 105, and/or control unit 120 described with reference to FIG. 1. In some examples, a control unit 120 may execute one or more sets of codes to control the functional elements of the receiving unit 110 to perform the functions described below. Additionally or alternatively, 110 receiving unit 110 may perform one or more of the functions described below using special-purpose hardware.

At block 1505, the method 1500 may include recognizing a secondary authentication prior to modifying the status of the at least one component of the automation system. The secondary authentication may include any of a biometric validation, or a secondary access code, or a combination thereof. The biometric validation may comprise fingerprint recognition, voice recognition, and the like. A secondary access code may be a specific user-assigned code or may be a single use one-time code. In some embodiments, the mobile device may have a mobile identifier.

The operation(s) at blocks 1505 may be performed using the authentication module 510 described with reference to FIG. 5.

At block 1510, the method 1500 may include disarming an alarm associated with the automation system. For example, the user may be remote from the system. When the user is remote, the security system may be in an armed state. The armed state may include an active alarm status. When the user approaches the residence and its identity is confirmed, the method 1500 may disarm the alarm status of the automation system. This may allow the user to seamlessly enter the home without the need to rush and enter a code into a control panel to disarm the system.

At block 1515, the method 1500 may include performing a secondary action based at least in part on a plurality of predetermined preferences inputted by the user. For example, each individual user of the automation system may have different residential preferences. One user may prefer a warmer or colder home than another user. Alternatively and/or additionally, a user may prefer a set of lights in the home turned on upon arrival to the residence. Other actions may include adjusting a setting of surveillance equipment, adjusting irrigation settings, and the like.

The operation(s) at blocks 1515 may be performed using the action module 515 described with reference to FIG. 5.

Thus, the method 1500 may provide for mobile supported disarming relating to automation/security systems. It should be noted that the method 1500 is just one implementation and that the operations of the method 1500 may be rearranged or otherwise modified such that other implementations are possible.

In some examples, aspects from two or more of the methods 800-1500 may be combined and/or separated. It should be noted that the methods 800-1500 are just example implementations, and that the operations of the methods 800-1500 may be rearranged or otherwise modified such that other implementations are possible.

Figure 16:
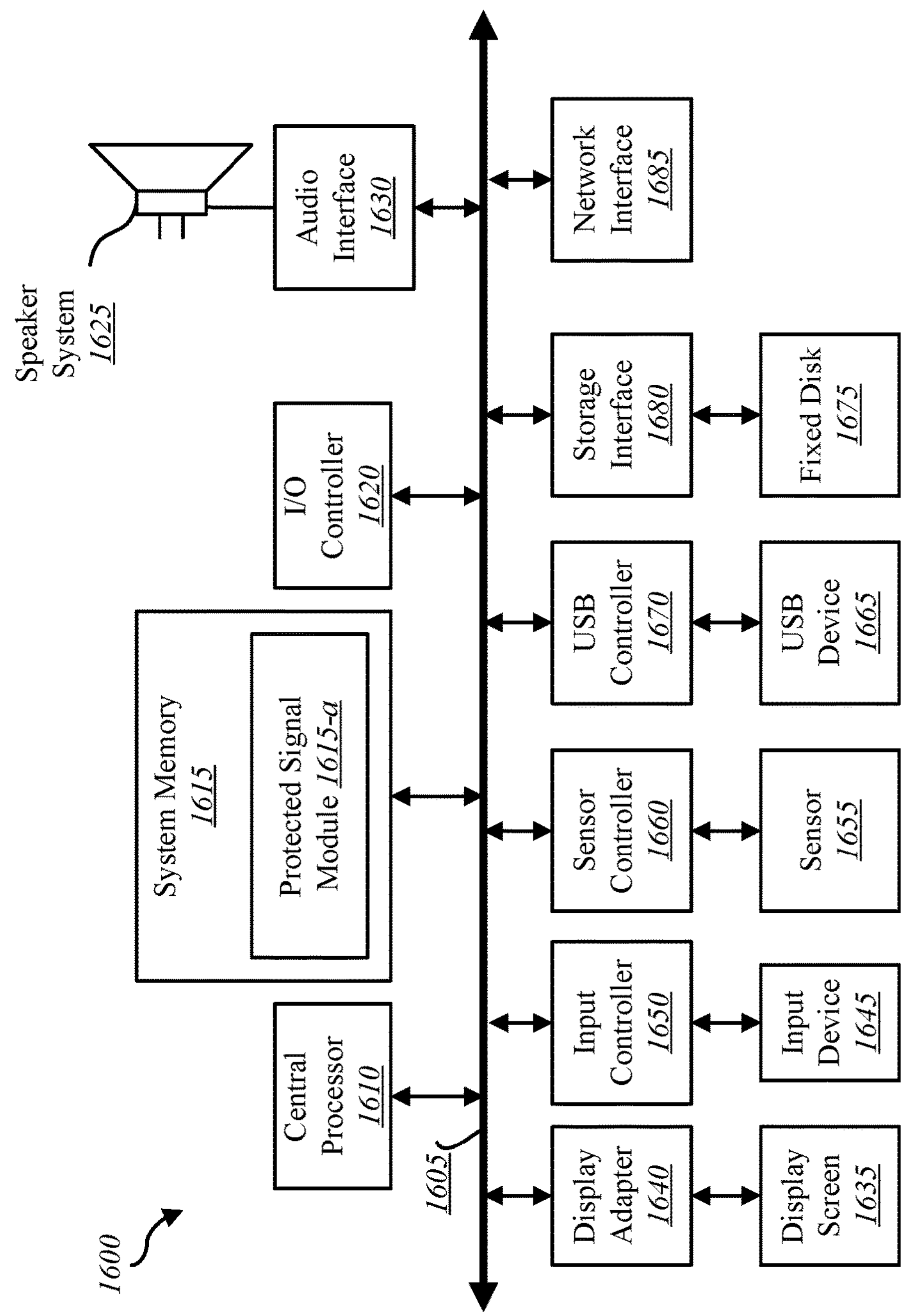
FIG. 16 depicts a block diagram of exemplary systems and methods suitable for implementing the present systems and methods.

FIG. 16 depicts a block diagram of a controller 1600 suitable for implementing the present systems and methods. In some embodiments, controller 1600 includes a bus 1605 which interconnects major subsystems of controller 1600, such as a central processor 1610, a system memory 1615 (typically RAM, but which may also include ROM, flash RAM, and/or the like), an input/output controller 1620, an external audio device, such as a speaker system 1625 via an audio output interface 1630, an external device, such as a display screen 1635 via display adapter 1640, an input device 1645 (e.g., remote control device interfaced with an input controller 1650), multiple USB devices 1665 (interfaced with a USB controller 1670), and a storage interface 1680. Also included are at least one sensor 1655 connected to bus 1605 through a sensor controller 1660 and a network interface 1685 (coupled directly to bus 1605).

Bus 1605 allows data communication between central processor 1610 and system memory 1615, which may include read-only memory (ROM) or flash memory (neither shown), and random access memory (RAM) (not shown), as previously noted. The RAM is generally the main memory into which the operating system and application programs are loaded. The ROM or flash memory may contain, among other code, the Basic Input-Output system (BIOS) which controls basic hardware operation such as the interaction with peripheral components or devices. For example, the protected signal module 1615-*a* to implement the present systems and methods may be stored within the system memory 1615. Applications resident with controller 1600 are generally stored on and accessed via a non-transitory computer readable medium, such as a hard disk drive (e.g., fixed disk drive 1675) or other storage medium. Additionally, applications may be in the form of electronic signals modulated in accordance with the application and data communication technology when accessed via network interface 1685.

Storage interface 1680, as with the other storage interfaces of controller 1600, may connect to a standard computer readable medium for storage and/or retrieval of information, such as a fixed disk drive 1675. Fixed disk drive 1675 may be a part of controller 1600 or may be separate and accessed through other interface systems. Network interface 1685 may provide a direct connection to a remote server via a direct network link to the Internet via a POP (point of presence). Network interface 1685 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 1600 wirelessly via network interface 1685 and/or using wired connections.

Many other devices or subsystems may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 16 need not be present to practice the present systems and methods. The devices and subsystems may be interconnected in different ways from that shown in FIG. 16. The aspect of some operations of a system such as those shown in FIG. 16 may be readily known in the art and are not discussed in detail in this application. Code to implement the present disclosure may be stored in a non-transitory computer-readable medium such as one or more of system memory 1615 or fixed disk drive 1675. The operating system provided on controller 1600 may be iOS®, ANDROID®, MS-dOS®, MS-WINDOWS®, OS/2®, UNIX®, LINUX®, or another known operating system.

In some embodiments, one or more systems and/or system components may serve as or include one or more transmitters and/or receivers—such as an antenna—to receive one or more signals. The signals received may include wireless communication signals such as radio frequency, electromagnetics, local area network (LAN), wide area network (WAN), virtual private network (VPN), wireless network (using 802.11, for example), cellular network (using 3G and/or LTE, for example), or other signals. These antennas may include or be related to, but are not limited to, WWAN (GSM, CDMA, and WCDMA), WLAN (including Bluetooth and Wi-Fi), WMAN (WiMAX), antennas for mobile communications, antennas for Wireless Personal Area Network (WPAN) applications (including RFID and UWB). In some embodiments, each antenna may receive signals or information specific to itself. In other embodiments, each antenna may receive signals or information not exclusive to itself.

The detailed description set forth above in connection with the appended drawings describes examples and does not represent the only instances that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with this disclosure may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, and/or state machine. A processor may also be implemented as a combination of computing devices, e.g., a combination of a DSP and a microprocessor, multiple microprocessors, one or more microprocessors in conjunction with a DSP core, and/or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In addition, any disclosure of components contained within other components or separate from other components should be considered exemplary because multiple other architectures may potentially be implemented to achieve the same functionality, including incorporating all, most, and/or some elements as part of one or more unitary structures and/or separate structures.

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM, DVD, or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed.

This disclosure may specifically apply to security system applications. This disclosure may specifically apply to automation system applications. In some embodiments, the concepts, the technical descriptions, the features, the methods, the ideas, and/or the descriptions may specifically apply to security and/or automation system applications. Distinct advantages of such systems for these specific applications are apparent from this disclosure.

The process parameters, actions, and steps described and/or illustrated in this disclosure are given by way of example only and can be varied as desired. For example, while the steps illustrated and/or described may be shown or discussed in a particular order, these steps do not necessarily need to be performed in the order illustrated or discussed. The various exemplary methods described and/or illustrated here may also omit one or more of the steps described or illustrated here or include additional steps in addition to those disclosed.

Furthermore, while various embodiments have been described and/or illustrated here in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may permit and/or instruct a computing system to perform one or more of the exemplary embodiments disclosed here.

This description, for purposes of explanation, has been described with reference to specific embodiments. The illustrative discussions above, however, are not intended to be exhaustive or limit the present systems and methods to the precise forms discussed. Many modifications and variations are possible in view of the above teachings. The embodiments were chosen and described in order to explain the principles of the present systems and methods and their practical applications, to enable others skilled in the art to utilize the present systems, apparatus, and methods and various embodiments with various modifications as may be suited to the particular use contemplated.

What is claimed is:

1. A method for security and/or automation systems, comprising:

identifying a mobile device associated with a user entering a geographical region surrounding a residence;

detecting that the mobile device has connected with a Wi-Fi network associated with the residence;

receiving a first indication of authentication information from the mobile device, the first indication of authentication information associated with the mobile device;

authenticating the first indication of authentication information;

detecting a pre-determined number of occurrences of an event associated with a component of an automation system associated with the residence;

receiving a second indication of authentication information from the mobile device, wherein the second indication of authentication information includes a new encryption key inserted into the second indication based at least in part on detecting the pre-determined number of occurrence of the event;

authenticating the second indication of authentication information;

authenticating the mobile device based at least in part on authenticating the first indication of authentication information and the second indication of authentication information; and automatically deactivating a security component of the automation system associated with the residence based at least in part on the authenticating the mobile device.

2. The method of claim 1, wherein automatically deactivating the security component comprises any of:

disarming an alarm associated with the automation system, or unlocking at least one door in the residence, or deactivating an audio and/or video monitoring system, or a combination thereof.

3. The method of claim 1, wherein the residence is in an active alarm state prior to the identifying.

4. The method of claim 1, wherein deactivating the security component of the automation system further comprises:

recognizing a secondary authentication prior to deactivating the security component of the automation system, wherein the secondary authentication includes any of a biometric validation, or a secondary access code, or a combination thereof.

5. The method of claim 1, further comprising:

establishing a geo-fence associated with the geographical region surrounding the residence.

6. The method of claim 5, further comprising:

tracking a location of the mobile device in relation to the established geo-fence.

7. The method of claim 1, further comprising:

performing a secondary action based at least in part on a plurality of predetermined preferences inputted by the user associated with the mobile device.

8. The method of claim 7, wherein the secondary action comprises any of turning on or off a plurality of lights, or adjusting a thermostat, or activating or deactivating a component of the security and/or automation systems, or a combination thereof.

9. The method of claim 1, further comprising:

recognizing an entry into the residence by the user.

10. The method of claim 9, wherein recognizing the entry further comprises:

identifying a user-specific code used to enter the residence.

11. An apparatus for security and/or automation systems, comprising:

a processor;

memory in electronic communication with the processor; and instructions stored in the memory, the instructions being executable by the processor to:

identify a mobile device associated with a user entering a geographical region surrounding a residence;

detect that the mobile device has connected with a Wi-Fi network associated with the residence;

receive a first indication of authentication information from the mobile device, the first indication of authentication information associated with the mobile device;

authenticate the first indication of authentication information;

detect a pre-determined number of occurrences of an event associated with a component of an automation system associated with the residence;

receive a second indication of authentication information from the mobile device, wherein the second indication of authentication information includes a new encryption key inserted into the second indication based at least in part on detecting the pre-determined number of occurrence of the event;

authenticate the second indication of authentication information;

authenticate the mobile device based at least in part on authenticating the first indication of authentication information and the second indication of authentication information; and automatically deactivate a security component of the automation system associated with the residence based at least in part on the authenticating the mobile device.

12. The apparatus of claim 11, wherein the instructions to deactivate the security component of the automation system are further executable to:

disarm an alarm associated with the automation system, or unlock at least one door in the residence, or deactivate an audio and/or video monitoring system, or a combination thereof.

13. The apparatus of claim 12, wherein the residence is in an active alarm state prior to the identifying.

14. The apparatus of claim 11, wherein the instructions to deactivate the security component of the automation system are further executable to:

recognize a secondary authentication prior to deactivating the security component of the automation system, wherein the secondary authentication includes any of a biometric validation, or a secondary access code, or a combination thereof.

15. The apparatus of claim 11, wherein the instructions are further executable to:

establish a geo-fence associated with the geographical region surrounding the residence.

16. A non-transitory computer-readable medium storing computer-executable code, the code executable by a processor to:

identify a mobile device associated with a user entering a geographical region surrounding a residence;

detect that the mobile device has connected with a Wi-Fi network associated with the residence;

receive a first indication of authentication information from the mobile device, the first indication of authentication information associated with the mobile device;

authenticate the first indication of authentication information;

detect a pre-determined number of occurrences of an event associated with a component of an automation system associated with the residence;

receive a second indication of authentication information from the mobile device, wherein the second indication of authentication information includes a new encryption key inserted into the second indication based at least in part on detecting the pre-determined number of occurrence of the event;

authenticate the mobile device based at least in part on authenticating the first indication of authentication information and the second indication of authentication information; and automatically deactivate a security component of the automation system associated with the residence based at least in part on the authenticating the mobile device.

17. The non-transitory computer-readable medium of claim 16, wherein the code to automatically deactivate the security component of the automation system is further executable to:

disarm an alarm associated with the automation system, or unlock at least one door in the residence, or deactivate an audio and/or video monitoring system, or a combination thereof.

18. The non-transitory computer-readable medium of claim 17, wherein the residence is in an active alarm state prior to the identifying.

19. The non-transitory computer-readable medium of claim 16, wherein the code to deactivate the security component of the automation system is further executable to:

recognize a secondary authentication prior to modifying the status of the at least one component of the automation system, wherein the secondary authentication includes any of a biometric validation, or a secondary access code, or a combination thereof.

20. The non-transitory computer-readable medium of claim 16, wherein the code is further executable to:

establish a geo-fence associated with the geographical region surrounding the residence.

* * * * *